US012305716B2

(12) United States Patent
Eisengruber et al.

(10) Patent No.: US 12,305,716 B2
(45) Date of Patent: May 20, 2025

(54) ACTUATION MECHANISM

(71) Applicant: Means Industries, Inc., Saginaw, MI (US)

(72) Inventors: Gregory M Eisengruber, Saginaw, MI (US); Robert B Larimer, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/566,855

(22) PCT Filed: Oct. 7, 2022

(86) PCT No.: PCT/US2022/046073
§ 371 (c)(1),
(2) Date: Dec. 4, 2023

(87) PCT Pub. No.: WO2023/059892
PCT Pub. Date: Apr. 13, 2023

(65) Prior Publication Data
US 2024/0200616 A1 Jun. 20, 2024

Related U.S. Application Data

(60) Provisional application No. 63/253,201, filed on Oct. 7, 2021.

(51) Int. Cl.
*F16D 28/00* (2006.01)
*F16D 23/12* (2006.01)
(Continued)

(52) U.S. Cl.
CPC ............. *F16D 28/00* (2013.01); *F16D 23/12* (2013.01); *F16D 41/125* (2013.01); *F16D 41/14* (2013.01);
(Continued)

(58) Field of Classification Search
CPC ........ F16D 41/125; F16D 41/14; F16D 41/16; F16D 23/12; F16D 2023/123; F16D 41/04; F16D 41/061; F16D 28/00; F16H 25/125
See application file for complete search history.

(56) References Cited

U.S. PATENT DOCUMENTS 6,290,044 B1 * 9/2001 Burgman ............... F16D 41/125
192/85.48
9,933,023 B2 4/2018 Hemphill et al.
(Continued)

FOREIGN PATENT DOCUMENTS

WO WO2020217016 A1 10/2020

OTHER PUBLICATIONS

PCT/US2022/046073, Search Report, dated Feb. 24, 2023.
PCT/2022/046073, Written Opinion, dated Feb. 24, 2023.
PCT/2022/046073, Search Strategy, dated Jan. 31, 2023.

*Primary Examiner* — Richard M Lorence
(74) *Attorney, Agent, or Firm* — Burgess Law Office, PLLC

(57) ABSTRACT

A clutch assembly, such as a dynamically controllable clutch ("DCC"), having an actuator for controlling coupling members for engagement and disengagement of power components. The actuator includes a cylindrical cam member with an end face extending transversely to a rotational axis of the cam member. The end face has a first cam surface and a second cam surface. The first cam surface is radially spaced from and adjacent to the second cam surface. A first cam follower follows the first cam surface and a second cam follower follows the second cam surface. A first link extends between the first cam follower and a first coupling member, and a second link extends between the second cam follower and a second coupling member.

19 Claims, 23 Drawing Sheets

(51) Int. Cl.
  *F16D 41/12*    (2006.01)
  *F16D 41/14*    (2006.01)
  *F16D 41/16*    (2006.01)
  *F16H 25/12*    (2006.01)

(52) U.S. Cl.
  CPC .......... *F16D 41/16* (2013.01); *F16H 25/125* (2013.01); *F16D 2023/123* (2013.01)

(56) References Cited

U.S. PATENT DOCUMENTS

| | | |
|---|---|---|
| 10,704,613 B2 | 7/2020 | Rupp |
| 2006/0044455 A1 | 3/2006 | Kim et al. |
| 2009/0159391 A1* | 6/2009 | Eisengruber ............ F16D 41/16 192/48.7 |
| 2010/0307289 A1 | 12/2010 | Blanchard |
| 2021/0301885 A1* | 9/2021 | Essenmacher .......... F16D 41/14 |

* cited by examiner

ACTUATION MECHANISM

CROSS-REFERENCE TO RELATED APPLICATIONS

This application is a National Stage of International Application No. PCT/US2022/046073, filed Oct. 7, 2022, and claims the benefit of U.S. Provisional Application No. 63/253,401, filed Oct. 7, 2021. The disclosure of the above application is incorporated herein by reference.

BACKGROUND OF THE INVENTION

1. Field of the Invention

The present invention generally relates to actuators for controlling engagement and disengagement of power components.

2. Description of Related Art

A one-way clutch ("OWC") includes a first coupling member, a second coupling member, and at least one locking element between opposing surfaces of the coupling members. The locking element moves between a deployed or engaged position, in which the locking element extends from the first coupling member and engages the second coupling member, and a non-deployed or disengaged position in which the locking element does not extend from the first coupling member and does not engage the second coupling member. In the deployed position, the locking element engages the second coupling member wherein the OWC locks in one direction of rotation but has free rotation in the opposite direction.

A selectable OWC ("SOWC") produces a mechanical connection between rotating or stationary components in one or both directions and can overrun in one or both directions. A selectable OWC, also known as a two-way clutch, adds a second set of locking elements in combination with a selector plate. The second set of locking elements, plus the selector plate, adds multiple functions to the OWC. The selector plate is adjustable between different positions to implement the different operating modes.

A dynamically controllable clutch or dynamic selectable clutch ("DCC") fits in positions where typically dog clutches, synchronizers, and wet friction packs would be located.

FIGS. 1-5 show a DCC 12 according to the prior art. DCC 12 is a component of a system (not shown), such as an automotive transmission, further having an input power component (e.g., a drive shaft) and an output power component (e.g., a driven shaft).

The dynamically controllable clutch (DCC) 12 has a radially inner rotating race, i.e., a first coupling member in the form of a pocket plate 13 (FIGS. 4 and 5), and a radially outer rotating race, i.e., a second coupling member in the form of a notch plate 16. The pocket plate 13 is fixedly connected to a first power component of the system, and the notch plate 16 is fixedly connected to a second power component of the system. Consequently, the first and second power components are connected when pocket and notch plates 13 and 16 are connected.

The pocket plate 13 contains first and second sets of radial locking elements 26 for clockwise ("CW") and counter-clockwise ("CCW") engagement, respectively. During engagement, at least one of the sets of locking elements 26 simultaneously contacts the pocket and notch engagement faces of the pocket and notch plates 13, 16, connecting the pocket and notch plates 13, 16 together. The pocket and notch plates 13, 16 connect the first and second power components. Consequently, in each locked direction of rotation, the DCC 12 transmits torque between the power components, which are connected via the connected pocket and notch plates 13 and 16.

DCC 12 is actuated by an actuation system in the form of a linear motor or linear actuator 14. The linear actuator 14 includes a stator 22 and a translator 20. Stator 22 is fixed in position, for example, to a transmission case (not shown) via mounts 47. The stator 22 includes a pair of copper wire induction coils 44, 46. Steel plates 48, 50, and 52 provide a housing for the stator coils 44, 46. The stator coils 44, 46 are wound in series with reversed polarity relative to one another, anti-series.

The translator 20 linearly moves between lateral, axial positions. The translator 20 is fixedly connected to and rotates with the pocket plate 13. The translator 20 includes an annular ring of segmented permanent magnets 21, steel plates 23, 25, and rigid plungers 30. The plungers 30 operate the locking elements 26. The plungers 30 extend through holes formed through a carriage 51 of the translator 20 and are biased by springs 34. The plungers 30 are threaded at their ends and secured within their holes by internally threaded nuts 35. The conical ends of plungers 30 extend through the apertures of a ring 55.

FIGS. 2-5 show the linear actuator 14 controlling the locking elements 26. Depending on actuation direction, the plungers 30 within the translator 20 directly contact the locking elements 26 and cause them to pitch up or down. The linear actuator 14 has an "off" position, shown in FIGS. 2 and 4, and an "on" position, shown in FIGS. 3 and 5. The linear actuator 14 switches between the "off" and "on" positions by causing the translator 20 to laterally move between, in this case, a right-most position, shown in FIGS. 2 and 4, and a left-most position shown in FIGS. 3 and 5.

When the translator 20 moves from "off" to "on," each plunger 30 contacts the under face or surface of its locking element 26 so the locking element can engage the notch plate 16. The DCC 12 transmits torque in each locked direction of rotation when the locking elements 26 are engaged with notch plate 16. A return spring 28 under each locking element 26 is compressed during the engaged state. When commanded "off," the translator 20 moves back toward the "off" position, and the plungers 30 lose contact with the locking elements 26. Compressed return springs 28 create a force causing the locking elements 26 to pitch downward or disengage. Once a torque reversal occurs, the locking elements 26 can disengage, and the DCC 12 can freewheel.

To change the state from "off" to "on," an electrical current energizes the stator coil 46 nearest to the translator 20. The energized stator coil 46 produces a magnetic field that repels the steady state field generated by the permanent magnets 21, while the far stator coil 44 produces an attractive magnetic field. The combination of repelling and attracting forces caused by the stator coils 44 and 46 causes the translator 20 to move.

Once the translator 20 passes over the center stator steel plate 50, the permanent magnets 21 attempt to fully align the left-most stator steel plate 48. A mechanical stop 53, shown in FIGS. 4 and 5, prevents complete alignment, which results in a biasing force that holds the translator 20 in the "on" position. The translator 20 is magnetically latched in the "on" position.

To disengage the DCC 12, electrical current is applied to the stator coil 44 nearest to the translator 20, formerly the far stator coil 46, and the linear actuator 14 moves from the "on" stop 53 to a ring which functions as an "off" stop 42 in a similar manner described above. The "off" mechanical stop 42 prevents complete alignment of the permanent magnet 21 and the right-most stator steel plate 52, remaining magnetically latched in the "off" position.

SUMMARY OF THE INVENTION

An actuation mechanism having an actuator for controlling the engagement and disengagement of power components.

The actuator includes a cylindrical cam member with an end face extending transversely to a rotational axis of the cam member, the end face having a first cam surface and a second cam surface. The first cam surface is radially spaced from and adjacent to the second cam surface. A first cam follower follows the first cam surface and a second cam follower follows the second cam surface. A first link extends between the first cam follower and a first coupling member, and a second link extends between the second cam follower and a second coupling member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

Figure 1:
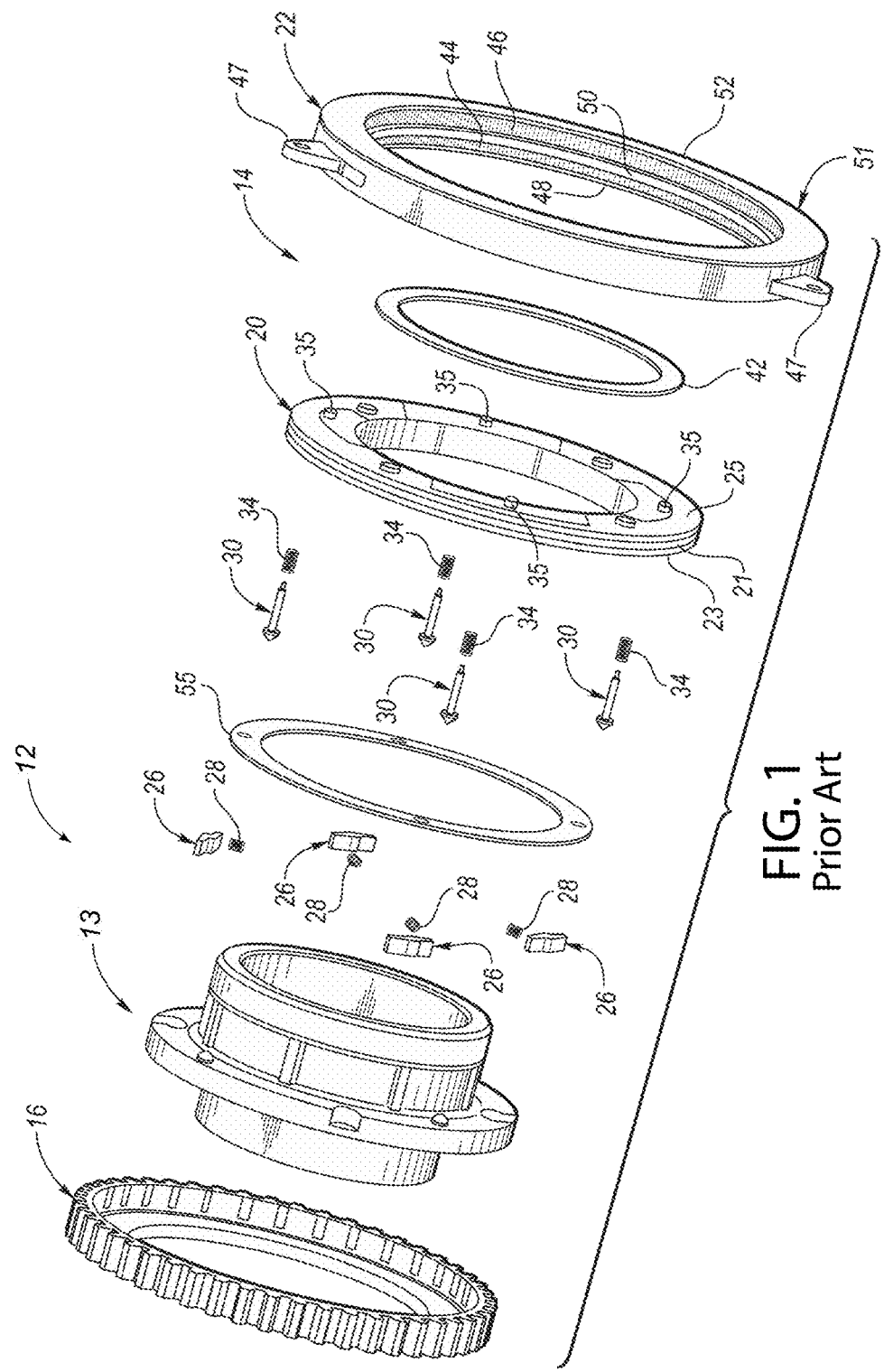
FIG. 1 is an exploded view of a dynamically controllable clutch ("DCC") in accordance with the prior art.
Figure 2:
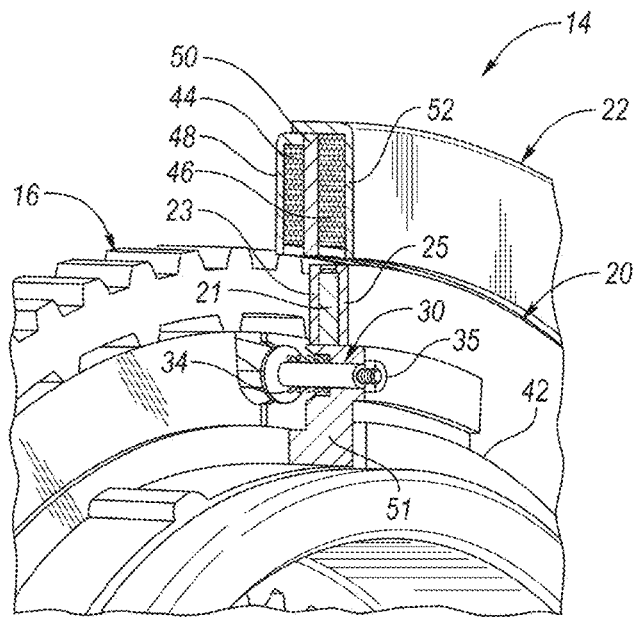
FIG. 2 is a perspective view, partially broken away and in cross-section, of the prior art DCC with a linear actuator of the DCC being in an "off" position whereby the DCC is in a freewheel mode.
Figure 3:
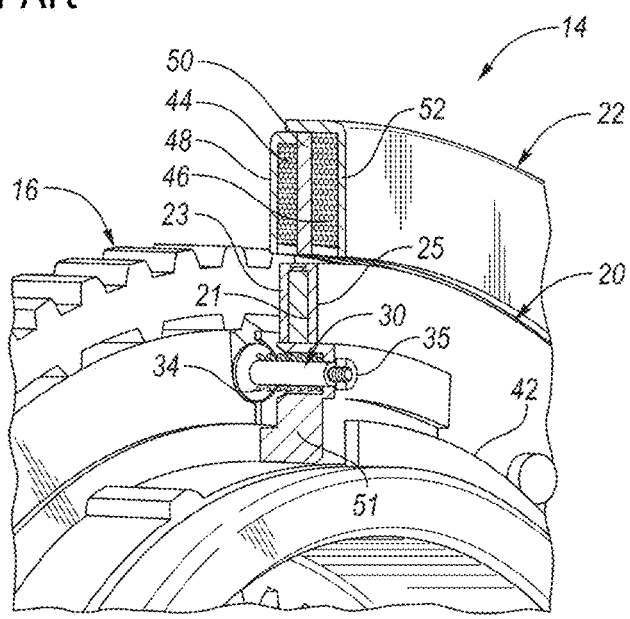
FIG. 3 is a perspective view, partially broken away and in cross-section, of the prior art DCC with the linear actuator being in an "on" position whereby the DCC is in a lock mode.
Figure 4:
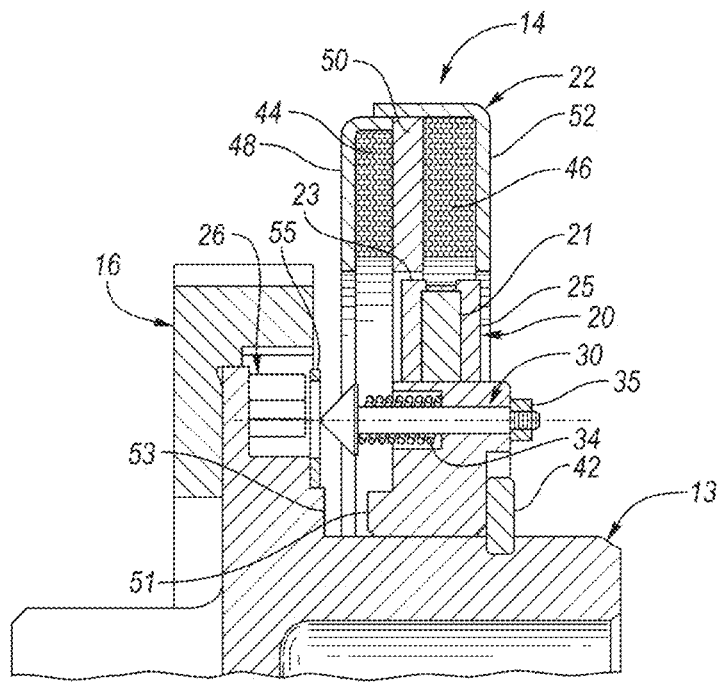
FIG. 4 is a side view, partially broken away and in cross-section, of the prior art DCC with a translator of the linear actuator magnetically latched in the "off" position, wherein FIGS. 2 and 4 pertain to the same condition of the DCC.
Figure 5:
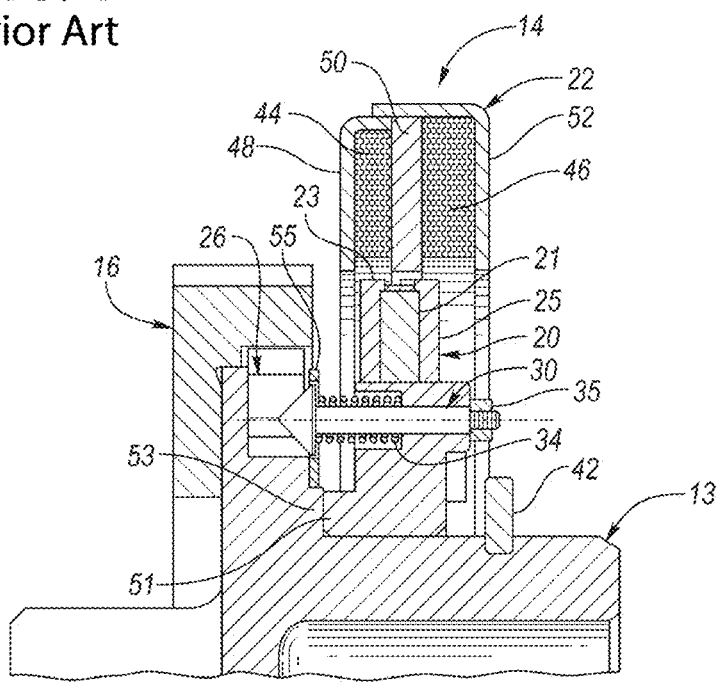
FIG. 5 is a side view, partially broken away and in cross-section, of the prior art DCC with the translator of the linear actuator magnetically latched in the "on" position, wherein FIGS. 3 and 5 pertain to the same condition of the DCC.
Figure 6:
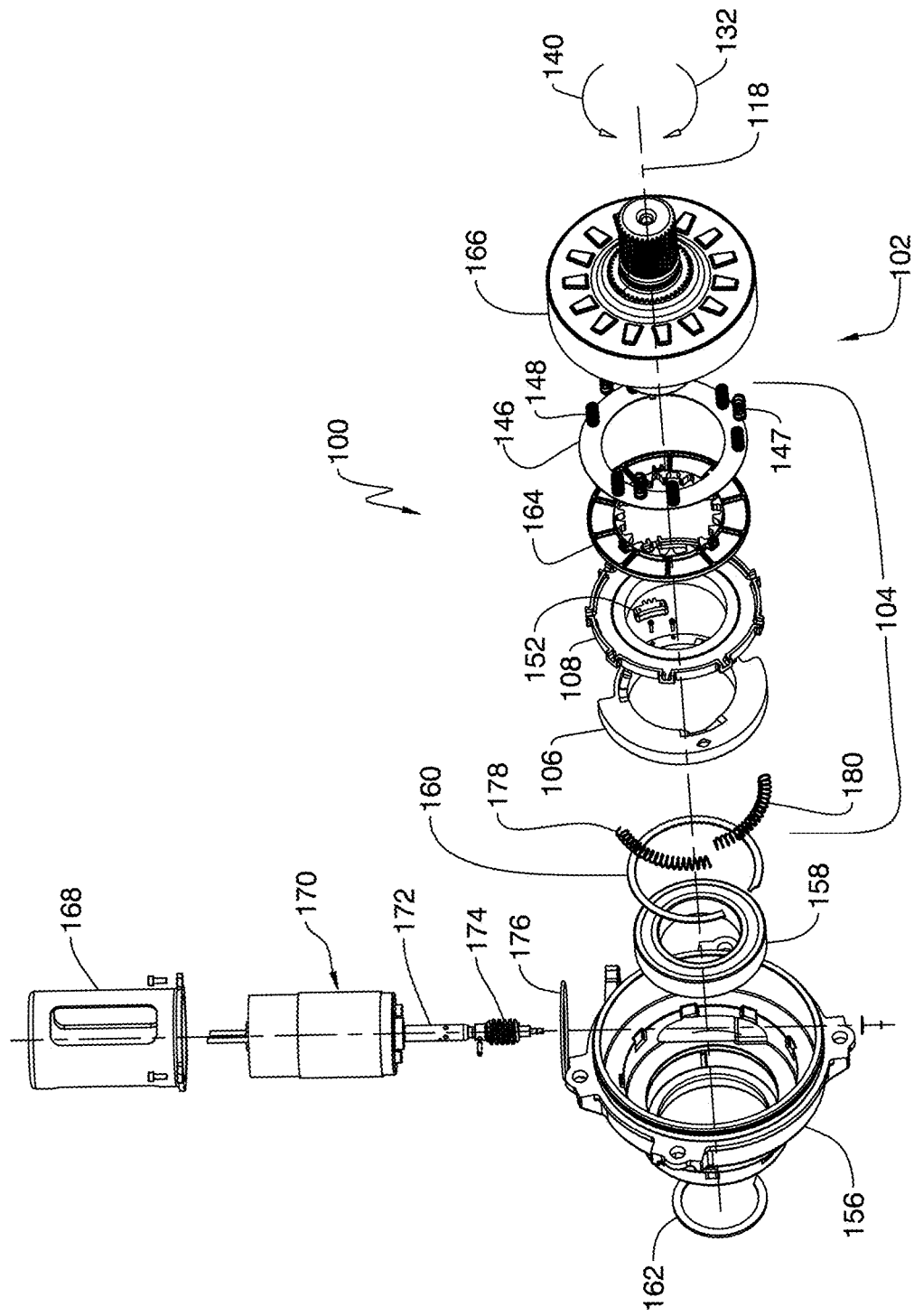
FIG. 6 is an exploded view, from the right side, of a system having an actuation mechanism according to one embodiment of the present invention.
Figure 7:
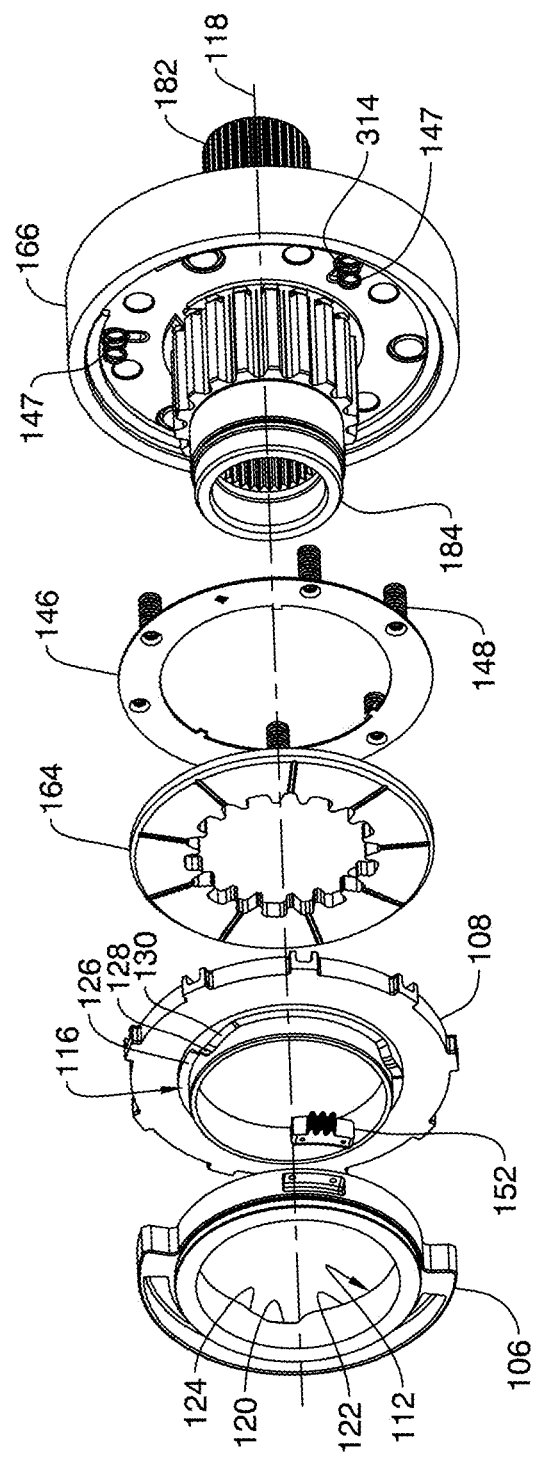
FIG. 7 is a partial, exploded view, from the left side, of the system of FIG. 6.
Figure 8:
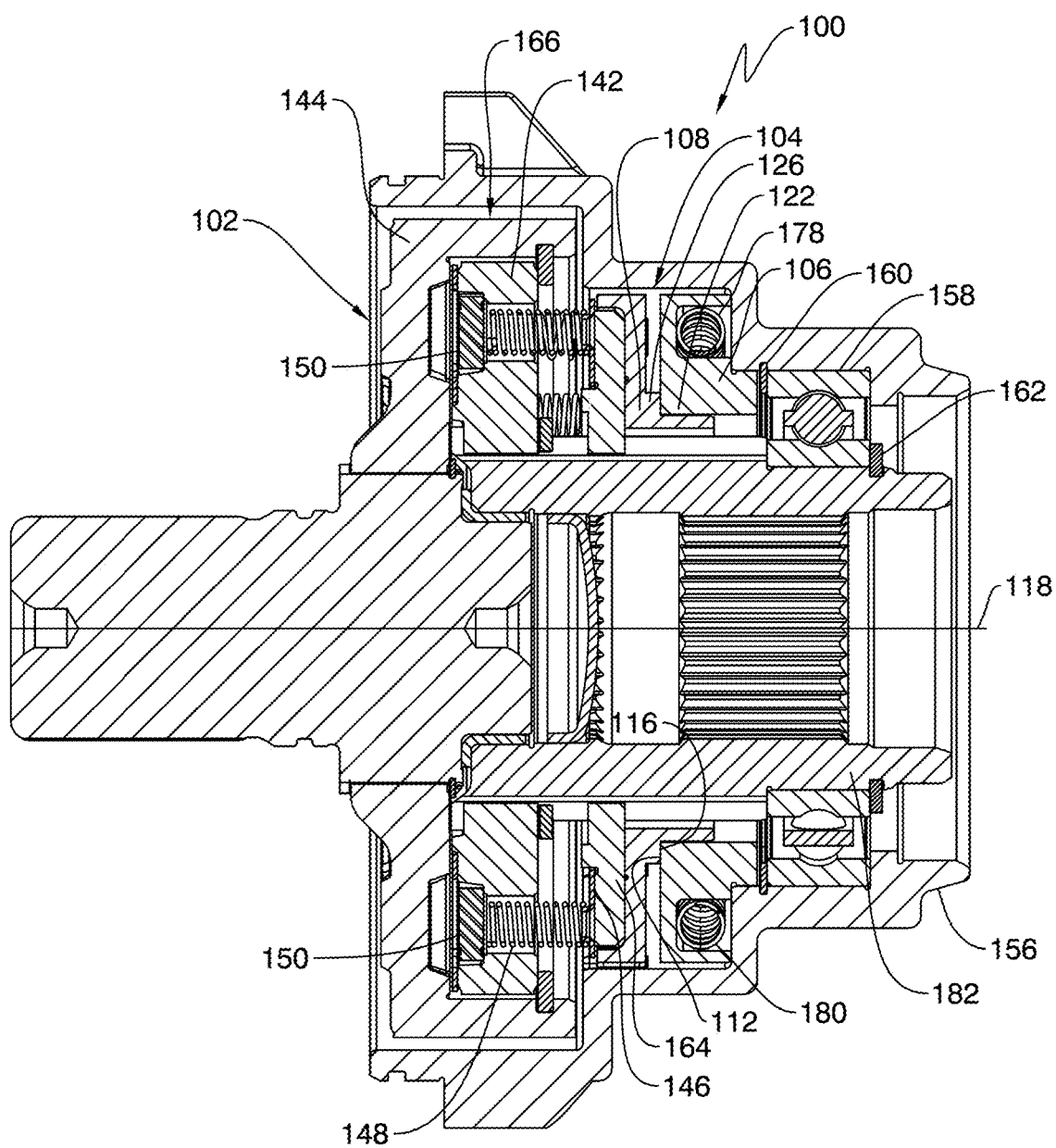
FIG. 8 is a partial, cross-sectional view of the system of FIG. 6.
Figure 9:
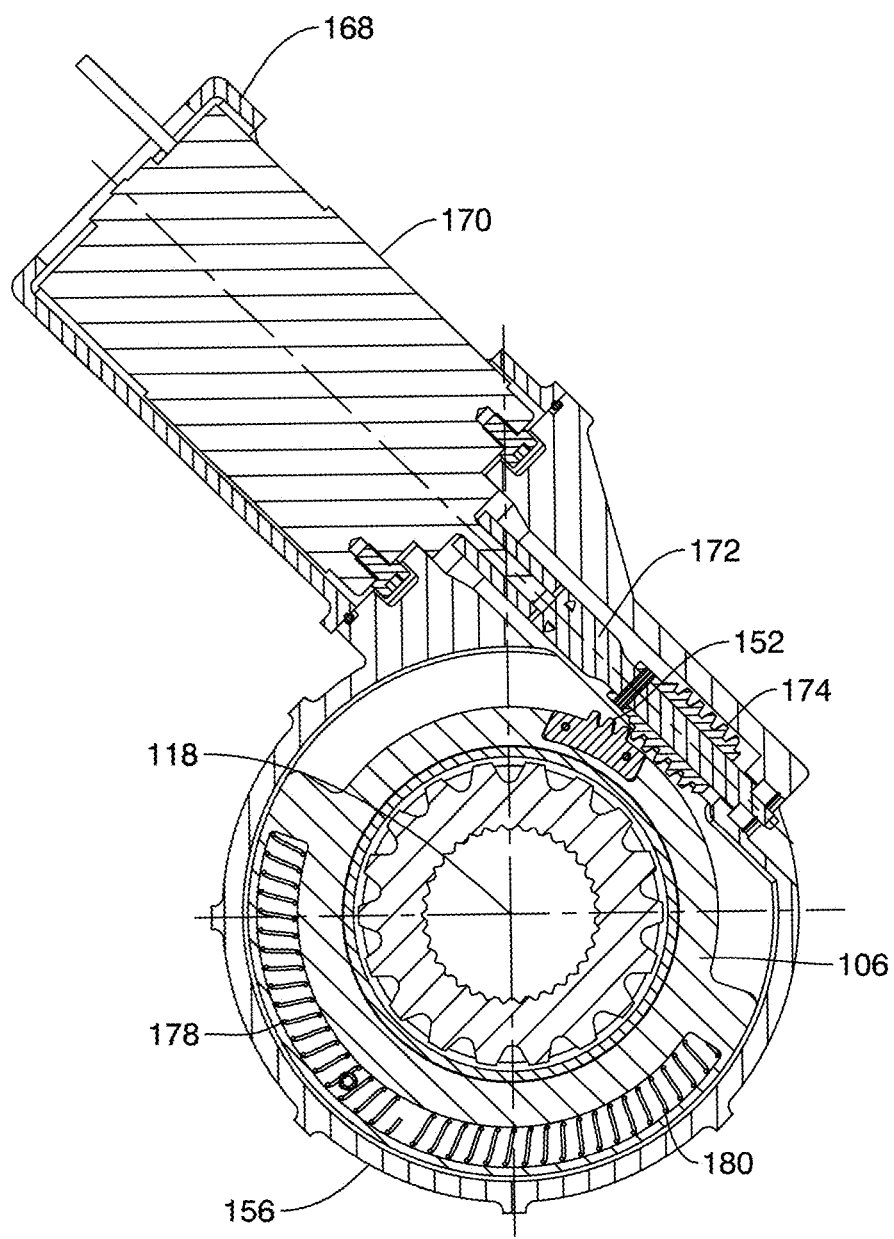
FIG. 9 is a partial, cross-sectional view of the system of FIG. 6.

The following description of the preferred embodiment(s) is merely exemplary and is in no way intended to limit the invention, application, or use.

Examples of the present invention are disclosed herein; however, it is to be understood that the disclosed embodiments are merely exemplary of the invention that may be embodied in various and alternative forms. The figures are not necessarily to scale; some features may be exaggerated or minimized to show details of the components. Therefore, specific structural and functional details disclosed herein are not to be interpreted as limiting but merely as a representative basis for teaching one skilled in the art to variously employ the present invention.

FIGS. 6-13 show one example of a system 100, including a clutch assembly 102 with a dynamically controllable clutch (DCC) 166 and a linear actuator 104. The dynamically controllable clutch (DCC) 166 typically includes a pocket plate 142, a notch plate 144, and a locking element 150, shown in FIG. 8. The pocket plate 142 connects to the first power component, for example a driveshaft 184, and the notch plate 144 connects to the second power component, for example a driven shaft 182. The linear actuator 104 includes a first cam member 106 and a second cam member 108. The linear actuator may also include a spring plate 146, having return springs 147 and actuation springs 148, and a thrust plate or bearing member 164. The actuation springs 148 of the spring plate 146 act on the locking elements 150, while the return springs 147 of the spring plate 146 contact the pocket plate 142 and bias the second cam member 108 axially toward the first cam member 106.

The clutch assembly 102 includes a clutch assembly housing 156, a bearing 158, and snap rings 160, 162. The first cam member 106 includes a gear sector 152. The system 100 also includes a motor housing 168 for a motor 170. The motor 170 includes a motor shaft 172, a worm 174, and an O-ring 176. The motor 170 is configured to actuate the first cam member 106 and cause the first cam member 106 to rotate about the rotational axis 118 in the directions shown by the arrows 132, 140.

The clutch assembly 102 includes biasing springs 178, 180 that maintain contact between the worm 174 and gear sector 152 of the first cam member 106. In another example, an electric or hydraulic mechanism may be used to rotate the first cam member 106.

The linear actuator 104 moves between a first, initial position and a second, extended position. Placing the linear actuator 104 in the second, extended position moves the locking element 150 to a deployed position and couples the pocket plate 142 and notch plate 144. When the linear actuator 104 is in the second, extended position the second cam member 108, through the spring plate 146 and actuation springs 148, causes the locking element 150 to couple the pocket plate 142 and notch plate 144. When the linear actuator 104 is in the first, initial position, the return springs 147 push the first cam member 106 and second cam member 108 together, see FIGS. 8 and 12, wherein the actuation springs 148 do not act on the locking elements 150 and the pocket plate 142 and notch plate 144 of the dynamically controllable clutch (DCC) 166 are decoupled. Consequently, when the linear actuator 104 is in the second, extended position, torque flow between components fixedly connected to the pocket plate 142 and the notch plate 144 is enabled.

The linear actuator 104 includes a cam mechanism. A cam mechanism usually consists of two moving elements mounted on a fixed frame, a cam, and a cam follower. The cam follower moves in a plane transverse to the axis of rotation of the cam.

The first cam member 106 is a rotating portion of a cylinder, with a cam face or cam surface 112 being one end of the cylinder. The first cam member 106 functions as the "cam," it is rotatably movable but axially fixed. The second cam member 108 is an axially moving portion of a cylinder, with a cam face or cam surface 116 being one end of the cylinder. The second cam member 108 functions as the "cam follower," it is rotatably fixed but axially movable. The second cam member 108 translates, moves axially in the longitudinal direction of the rotational axis 118, whereas the cam or first cam member 106 rotates about the rotational axis 118.

Figure 10:
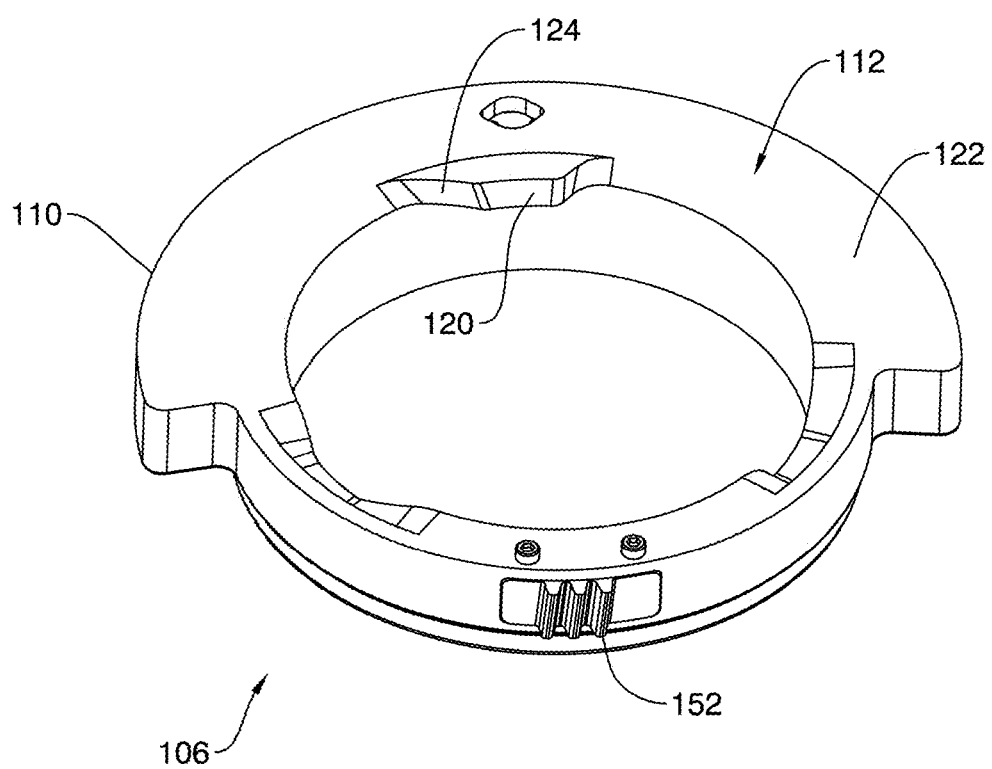
FIG. 10 is a perspective view of one component of the actuation mechanism of FIG. 6.
Figure 11:
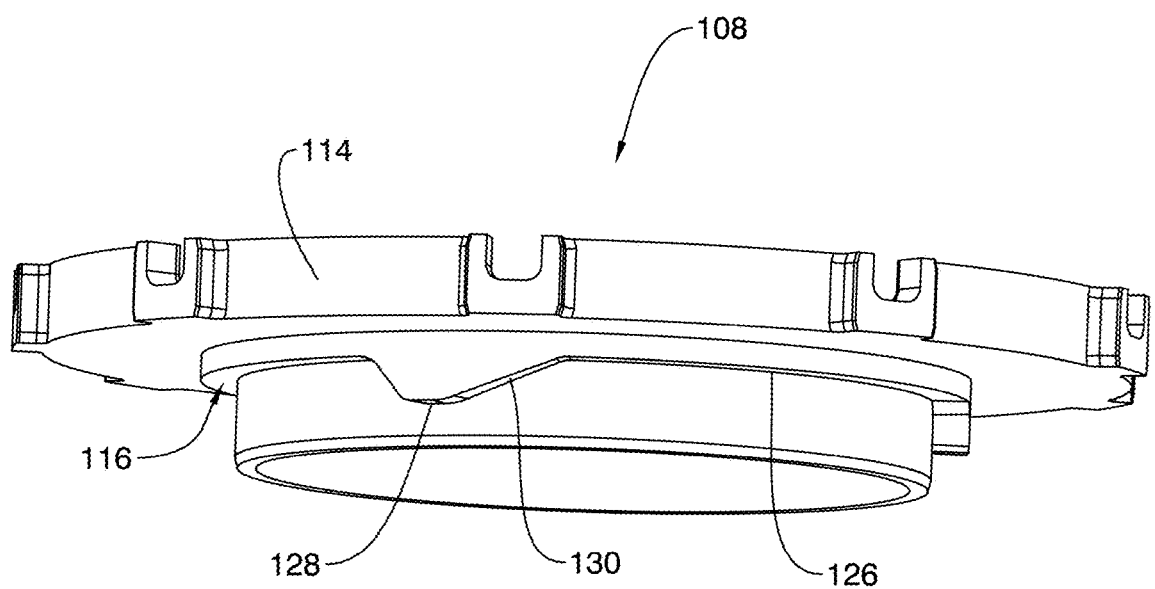
FIG. 11 is a perspective view of another component of the actuation mechanism of FIG. 6.
Figure 12:
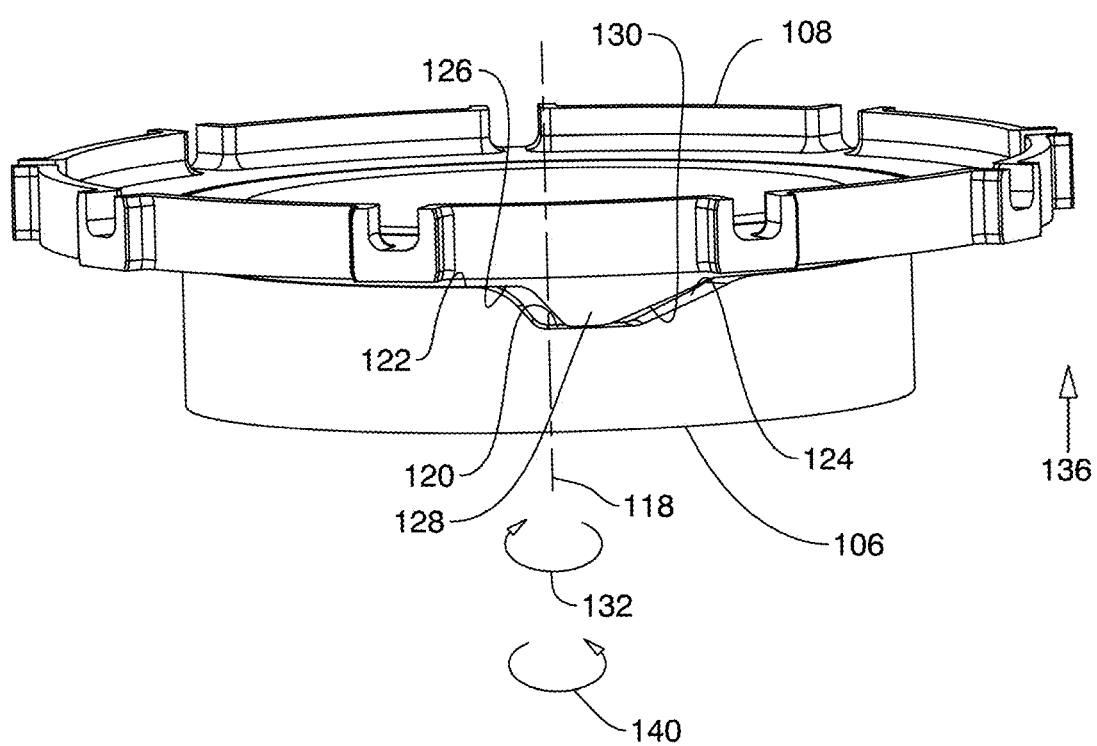
FIG. 12 is a perspective view of the components of FIGS. 10 and 11 in an initial position.
Figure 13:
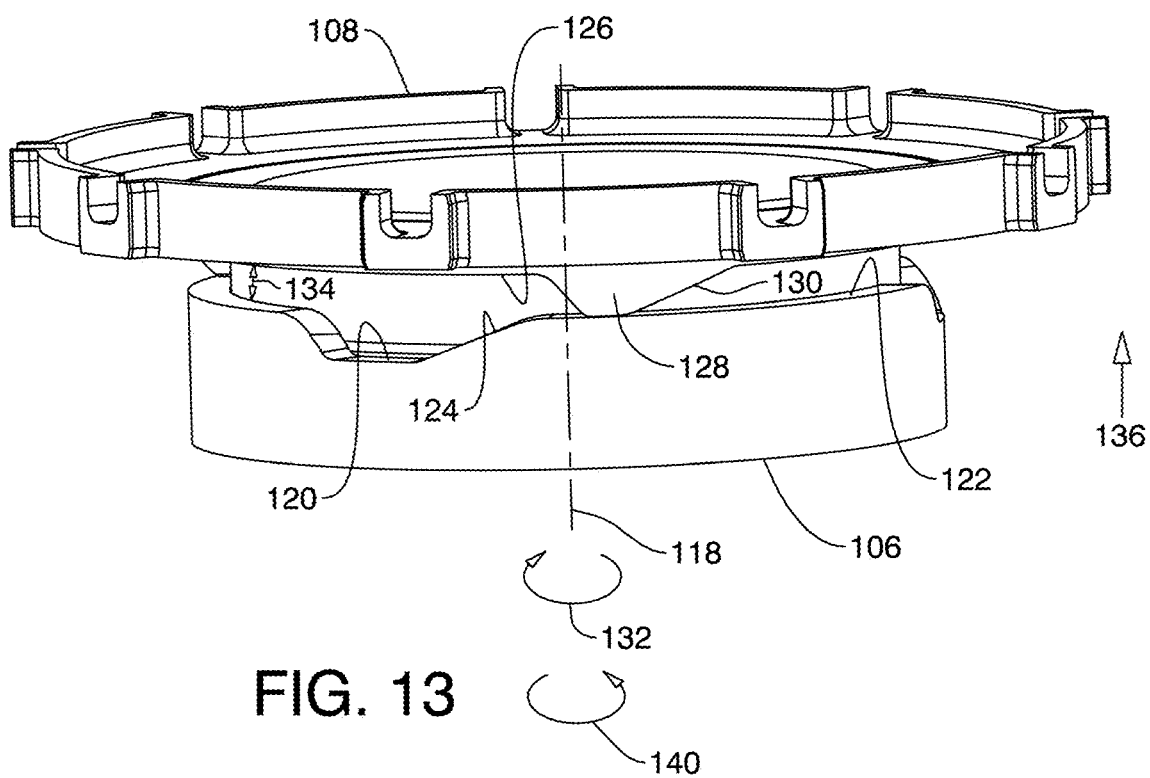
FIG. 13 is a perspective view of the components of FIGS. 10 and 11 in an extended position.
Figure 14:
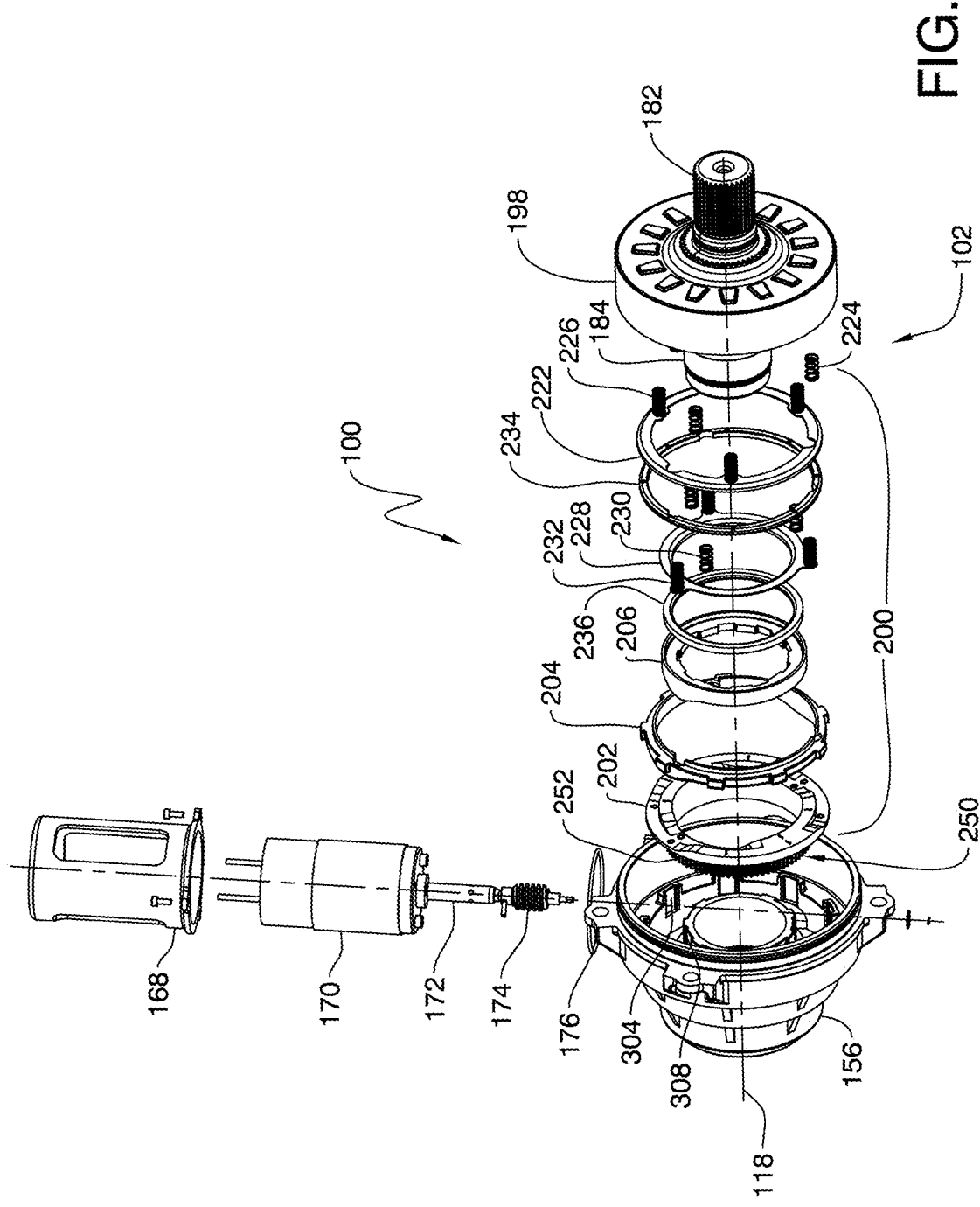
FIG. 14 is an exploded view, from the right side, of a system having an actuation mechanism according to another embodiment of the present invention.
Figure 15:
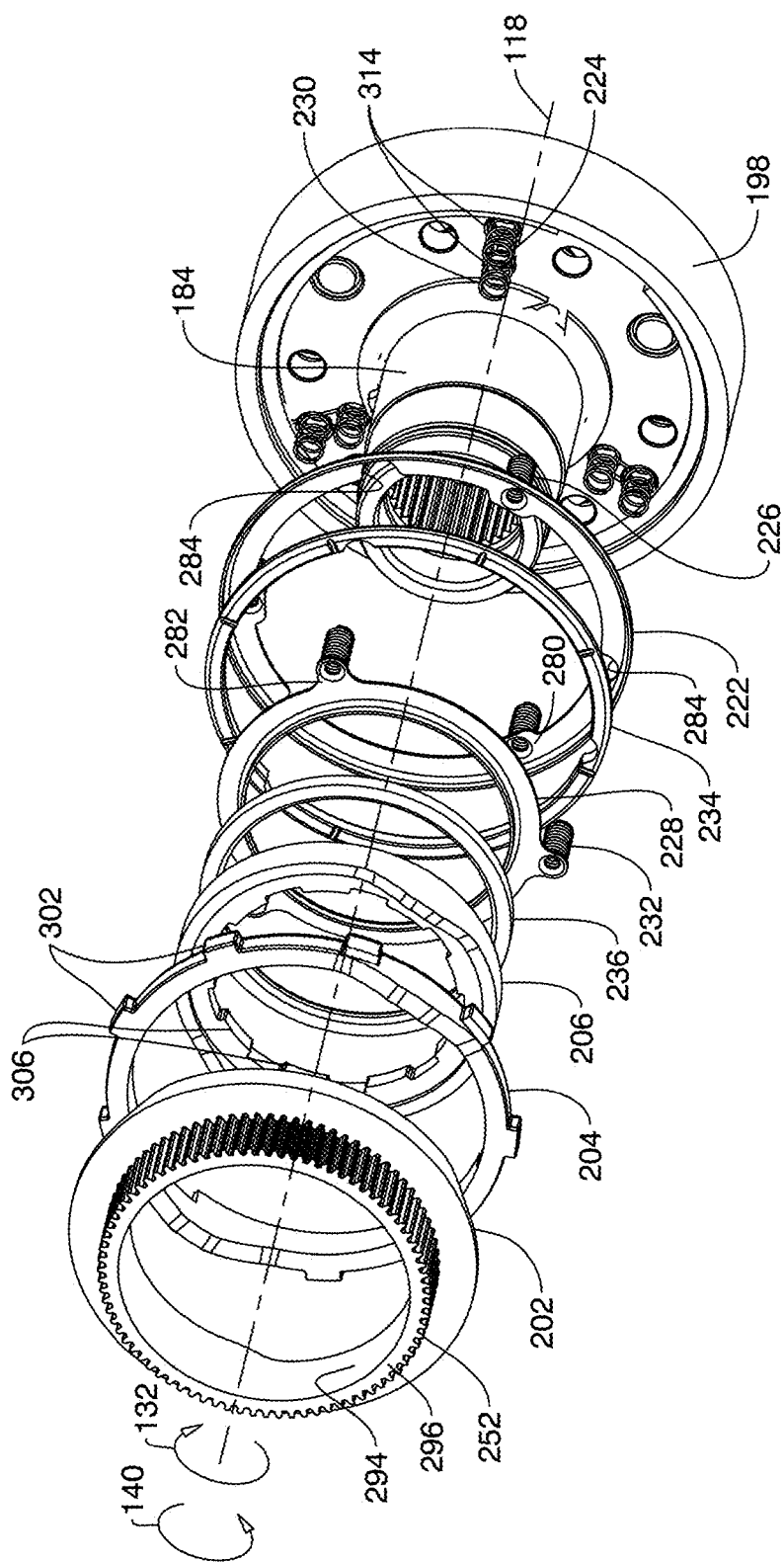
FIG. 15 is a partial, exploded view, from the left side, of the system of FIG. 14.
Figure 16:
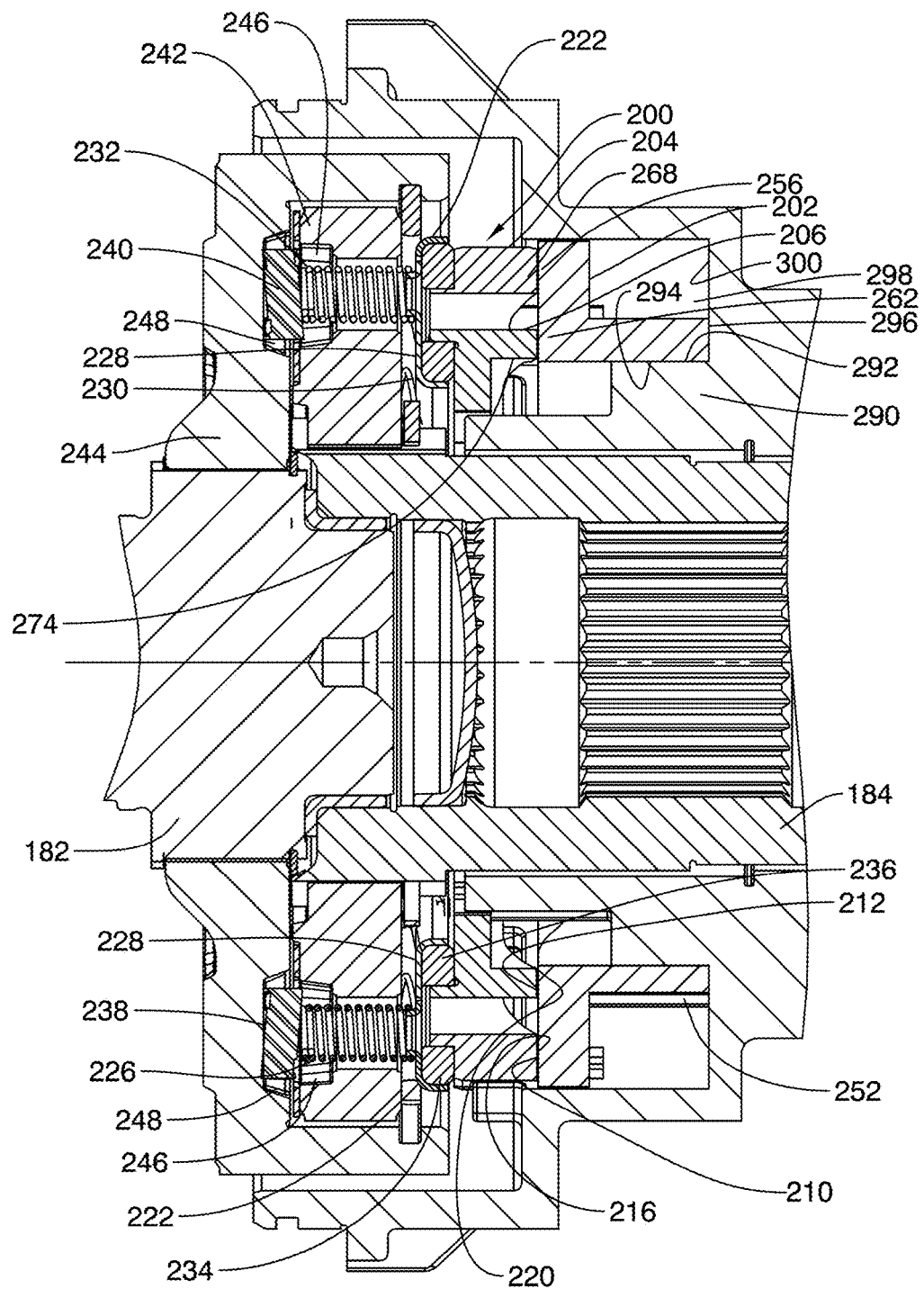
FIG. 16 is a partial, cross-sectional view of the system of FIG. 14.
Figure 17:
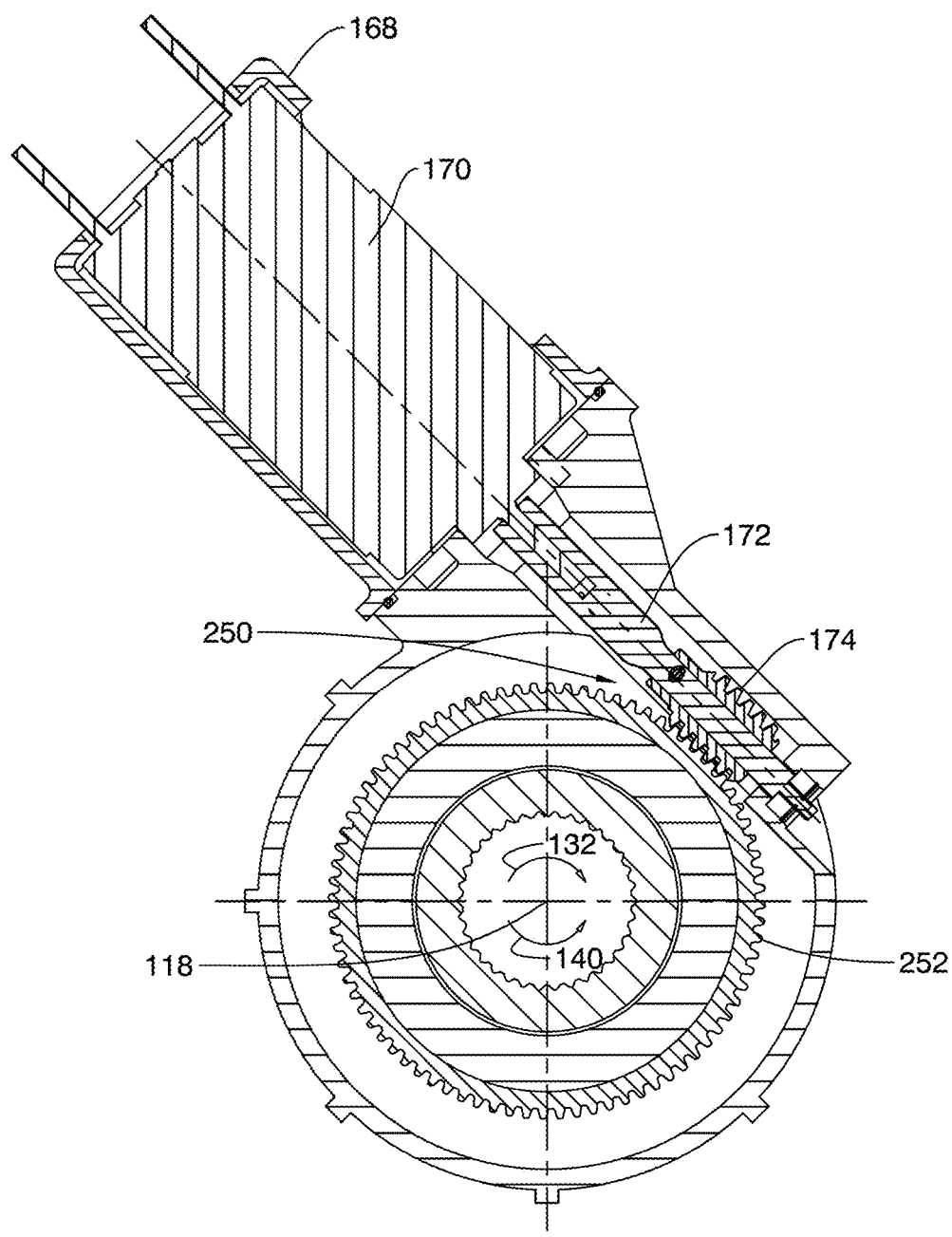
FIG. 17 is a partial, cross-sectional view of the system of FIG. 14.

In one example, the linear actuator 104 functions as a two-position actuator. FIG. 10 shows the first cam member 106 with a cylindrical body 110 and a cam surface 112. The cam surface 112 includes a base surface 120, a projecting member or surface 122, and ramps 124 between the base surface 120 and the projecting member or surface 122. The projecting member or surface 122 extends or projects axially from the base surface 120. FIG. 11 shows the second cam member 108 with a cylindrical body 114 with a cam surface 116. The cam surface 116 includes a base surface 126, a projecting member or surface 128, and ramp 130 between the base surface 126 and the projecting member or surface 128. The projecting member or surface 128 extends or projects axially from the base surface 126. FIG. 12 shows the linear actuator 104 in a first, initial position. As shown, the projecting member or surface 128 of the second cam member 108 is positioned adjacent to the base surface 120 of the first cam member 106. FIG. 13 shows the linear actuator 104 in a second, extended position. As shown, the projecting member or surface 128 of the second cam member 108 is positioned adjacent to the projecting member or surface 122 of the first cam member 106.

To move the linear actuator 104 to the second, extended position, the first cam member 106 rotates in the direction of the arrow 132 about the rotational axis 118. The interaction between cam surface 112 of the first cam member 106 and cam surface 116 of the second cam member 108 causes the second cam member 108 to move axially away from the first cam member 106 in the direction of the arrow 136. The projecting member or surface 128 of the second cam member 108 moves up the ramp 124 of the first cam member 106 until it reaches and moves along the projecting member or surface 122 of the first cam member 106, wherein the second cam member 108 moves axially away from the first cam member 106 a distance illustrated by the arrow 134.

The linear actuator 104 may be used to control system components; for example, engagement when the actuator is in the second, extended position and disengagement when the actuator is in the first, initial position. To return or retract the linear actuator 104 to the first, initial position, the first cam member 106 rotates in an opposite or second direction, shown by the arrow 140. The interaction between cam surface 112 of the first cam member 106 and cam surface 116 of the second cam member 108 enables the second cam member 108 to move axially toward the first cam member 106. The second cam member 108 is externally biased by the return spring 147 to move axially toward the first cam member 106.

In one example, the linear actuator 104 actuates a clutch assembly 102 between a first mode in which first and second coupling members of the clutch assembly 102 are coupled together and a second mode in which the first and second coupling members are not coupled together. The linear actuator 104 includes a first cam member 106 and a second cam member 108. The first cam member 106 has a cam surface 112 rotatably movable and axially fixed, and the second cam member 108 has a cam surface 116 rotatably fixed and axially movable. The first cam member 106 and second cam member 108 are axially stacked together with the respective cam surfaces 112, 116 facing each other. Rotation of the first cam member 106 and interaction of the cam surfaces 112, 116 axially moves the second cam member 108 away from the first cam member 106, placing the linear actuator 104 in the second, extended position. Placing the linear actuator 104 in the second, extended position moves the locking element 150 in a deployed position correspondingly coupling together the coupling members, for example, the pocket plate 142 and the notch plate 144 of the dynamically controllable clutch (DCC) 166.

When the first cam member 106 rotates in the opposite direction, shown by the arrow 140, the interaction between the respective cam surfaces 112, 116 allows the spring force applied by the return springs 147 to move the second cam member 108 axially toward the first cam member 106 whereby the linear actuator 104 is in the first, initial position and the coupling members, the pocket plate 142 and the notch plate 144, are not coupled together.

The first and second coupling members, the pocket plate 142 and the notch plate 144, are supported for rotation relative to one another in first and second directions about a rotational axis. A locking element 150 moves between a deployed position, in which the locking element 150 mechanically couples the coupling members together to prevent relative rotation of the coupling members in at least one direction about the rotational axis, and a non-deployed position, in which the coupling members are not mechanically coupled together by the locking element 150 whereby the coupling members may rotate relative to one another in the first and second directions about the rotational axis.

Interaction of the cam surfaces 112, 116 caused by rotation of the first cam member 106 in the direction of the arrow 132 axially moves the second cam member 108 away from the first cam member 106, putting the linear actuator 104 in a second, extended position and moving the locking element 150 to a deployed position. Interaction of the cam surfaces 112, 116 caused by rotation of the first cam member 106 in the opposite direction, direction of the arrow 140, axially moves the second cam member 108 toward the first cam member 106, putting the linear actuator 104 in the first, initial position wherein the locking element 150 is placed in the non-deployed position.

One example of the system includes first and second power components, such as a driveshaft and a driven shaft. The clutch assembly 102 includes first and second coupling members, for example, a pocket plate 142 and a notch plate 144. The pocket plate 142 connects to the first power component, the driveshaft 184, and the notch plate 144 connects to the second power component, the driven shaft 182. The first and second coupling members are supported for rotation relative to one another in first and second directions about a rotational axis.

The clutch assembly 102 also includes a locking element 150 movable between a deployed position in which the locking element mechanically couples the coupling members together and a non-deployed position in which the coupling members, and correspondingly the power components are not mechanically coupled together.

A link or connecting element extends between the second cam member 108 and the locking element 150. One example of a link or connecting element is the actuation spring 148 supported by the spring plate 146. The link or connecting element transfers the axial movement of the second cam member 108 to the locking element 150. When the linear actuator is in the second, extended position, the link or connecting element actuates the locking element 150, moving it to the deployed position. Other examples of a link or connecting element includes resilient members, rods, or shaped members.

FIGS. 14-30 show an alternative example of the system, including a clutch assembly 102 with a dynamically controllable clutch (DCC) 198 and a linear actuator, generally indicated at 200. In each of the following embodiments, similar or identical elements are given consistent reference numerals throughout the various figures and indicate corresponding parts.

The dynamically controllable clutch (DCC) 198 typically includes a pocket plate 242, a notch plate 244, a first locking element 238, and a second locking element 240. In one example, the first and second locking elements 238, 240 are in pockets 246 in the pocket plate 242.

The linear actuator 200 includes a first cam member 202, a second cam member or cam follower 204, and a third cam member or cam follower 206. The linear actuator 200 may also include inner and outer actuation members, for example, a first or outer spring plate 222, having return springs 224 and actuation springs 226, and a second or inner spring plate 228 having return springs 230 and actuation springs 232. Positioned between the respective second cam member or cam follower 204 and third cam member or cam follower 206 and the first and second spring plates 222 and 228 are first and second thrust plates or bearing members 234, 236.

The dynamically controllable clutch (DCC) 198 provides a clutch assembly 102 that operates in four different modes, multiple connected states, or modes of torque transfer depending on how the first and second locking elements 238, 240 are positioned; for example, deployed, extended, engaged, or non-deployed, retracted, nonengaged. The linear actuator 200 works with the dynamically controllable clutch (DCC) 198 to impose torque in the counterclockwise and clockwise directions. The following nomenclature (_/_) refers to rotation direction, clockwise and counterclockwise, for the dynamically controllable clutch (DCC) 198, wherein the left side of the slash signifies torque imposition in the counterclockwise direction, and the right of the slash signifies torque imposition in the clockwise direction. As used herein, a numeral (1) on the left side of the slash indicates torque imposition in the counterclockwise direction. A numeral zero (0) on the left side of the slash indicates no torque imposition in the counterclockwise direction. The same convention, either a one (1), indicating torque imposition in the clockwise direction, or a zero (0), indicating no torque imposition in the clockwise direction, is used on the right side of the slash. The direction of torque imposition identifies a locked state or direction.

A first mode of the clutch assembly is configured as follows, dynamically controllable clutch (DCC) 198—0/0. In this mode, the first locking element 238 and second locking element 240 of the dynamically controlled clutch (DCC) 198 are not deployed and are nonengaged. The first coupling or pocket plate 242 transmits no torque either clockwise or counterclockwise. Neither the first locking element 238 nor the second locking element 240 engages the second coupling or notch plate 244, and the pocket plate 242 transmits no torque in either direction to the notch plate 244. The notch plate 244 is free to rotate in both counterclockwise and clockwise directions with respect to the pocket plate 242.

A second mode of the clutch assembly is configured as follows, dynamically controllable clutch (DCC) 198—1/0. In this mode, the first locking element 238 of the dynamically controllable clutch (DCC) 198 is engaged. The second locking element 240 of the dynamically controllable clutch (DCC) 198 is nonengaged, wherein the pocket plate 242 transmits torque in one direction, for example, in the counterclockwise direction to the notch plate 244, overruns the notch plate 244 in the clockwise direction, and the notch plate 244 overruns the pocket plate 242 in the counterclockwise direction when the speed of rotation $\omega_{244}$ of the driven member, notch plate 244, in the counterclockwise direction is faster than the rotational speed $\omega_{242}$ of the driving member, pocket plate 242 in the counterclockwise direction.

A third mode of the clutch assembly is configured as follows, dynamically controllable clutch (DCC) 198—0/1. In this mode, the first locking element 238 of the dynamically controllable clutch (DCC) 198 is nonengaged. The second locking element 240 of the dynamically controllable clutch (DCC) 198 is engaged wherein the pocket plate 242 transmits torque in one direction, for example, the clockwise direction, to the notch plate 244, overruns the notch plate 244 in the opposite or counterclockwise direction, and the notch plate 244 overruns the pocket plate 242 in the clockwise direction when the speed of rotation $\omega_{244}$ of the driven member, notch plate 244, in the clockwise direction is faster than the rotational speed $\omega_{242}$ of the driving member, pocket plate 242 in the clockwise direction.

A fourth mode of the clutch assembly is configured as follows, dynamically controllable clutch (DCC) 198—1/1. In this mode, the locking elements 238, 240 of the dynamically controllable clutch (DCC) 198 are both engaged, wherein the pocket plate 242 transmits torque in both the counterclockwise and clockwise directions to the notch plate 244, and the notch plate 244 rotates with the pocket plate 242 in both directions.

The clutch assembly 102 of the system 100 further includes a clutch assembly housing 156. The system 100 also includes a motor housing 168 for a motor 170. The motor 170 includes a motor shaft 172, a worm 174, and an O-ring 176. A gear assembly, seen generally at 250, operates to rotate the first cam member 202. The gear assembly 250 includes a plurality of gear teeth, for example, a ring gear 252 on an outer peripheral surface of the first cam member 202. The ring gear 252 engages the worm 174, whereby rotation of the motor 170 in either direction translates into rotational movement of the first cam member 202 about the rotational axis 118. The motor 170 actuates the first cam member 202 of the linear actuator 200, causing the first cam member 202 to rotate about the rotational axis 118, in the directions shown by the arrows 132, 140. The linear actuator 200 actuates the dynamically controllable clutch 198 through all four modes. The first cam member 202 functions as the "cam," it is rotatably movable but axially fixed. The second and third cam members 204, 206 function as "cam followers," they are rotatably fixed but axially movable.

The clutch assembly housing 156 includes an axially extending spindle 290 that rotatably supports the first cam member 202 in an annular aperture or recess 298. An outer peripheral surface 292 of the spindle 290 engages and supports an inner peripheral surface 294 of the first cam member 202, wherein the first cam member 202 rotates about the spindle 290. An end face 296 of the first cam member 202 engages a shoulder or bearing face 300 of the annular aperture or recess 298 and limits axial movement of first cam member 202. The return springs 224, 230, supported in sockets or seats 314 in the pocket plate 242, act through the respective first and second spring plates 222, 228 and first and second thrust plates or bearing members 234, 236 on the second cam member or cam follower and third cam member or cam follower 204, 206 to push or bias the end or face 296 of the first cam member 202 against the shoulder or bearing face 300 of the clutch assembly housing 156. While the first cam member 202 rotates, it is constrained against axial motion.

The second cam member or cam follower 204 includes a plurality of outwardly extending projections, for example, ribs or ridges 302 that engage complementary grooves 304 in the clutch assembly housing 156. The ribs or ridges 302 and complementary grooves 304 allow the second cam member or cam follower 204 to move axially but not rotationally. The ribs or ridges 302 slide axially in the grooves 304. The third cam member or follower 206 includes a plurality of inwardly extending projections, for example, ribs or ridges 306 that engage complementary grooves 308 on the spindle 290. The ribs or ridges 306 and complementary grooves 308 allow the third cam member or follower 206 to move axially but not rotationally. The first and second thrust plate or bearing members 234, 236 provide a rotational interface and support between the respective second and third cam members or cam followers 204, 206, and the first and second spring plates 222, 228.

Figure 18:
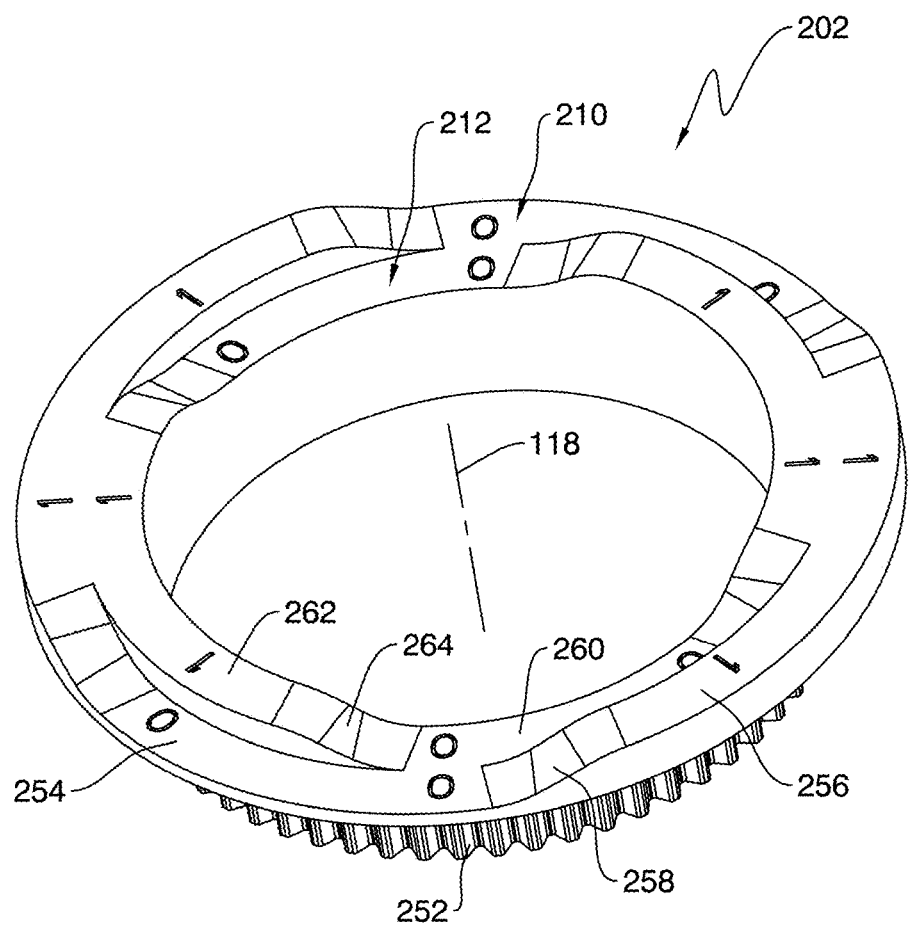
FIG. 18 is a perspective view of a component of the actuation mechanism of FIG. 14.

Referring to FIG. 18, the cam profiles of the first cam surface 210 and the second cam surface 212 of the first cam member 202 may have a "wave" shape, pattern, or configuration. The first cam surface 210 may include a base surface 254, a projecting member or surface 256, and ramps 258 extending between the base surface 254 and the projecting member or surface 256. The second cam surface 212 may include a base surface 260, a projecting member or surface 262, and ramps 264 extending between the base surface 260 and the projecting member or surface 262.

The cam or first cam member 202 is a rotating portion of a cylinder with the cam surfaces 210, 212 being on one end of the cylinder. The first cam surface 210 and the second cam surface 212 are concentric circular surfaces on one end of the cylindrical body of the first cam member 202. FIG. 18 shows the respective cam profile or configuration of each of the first and second cam surfaces 210, 212 associated with each mode or position of the dynamically controllable clutch (DCC) 198. As shown, each of the four positions is identified by the nomenclature 1/1, 0/1, 1/0, and 0/0 on the first cam member 202. When the second and third cam members or cam followers 204, 206 are positioned at the respective identified positions, the dynamically controllable clutch 198 is placed in the corresponding mode.

Figure 19:
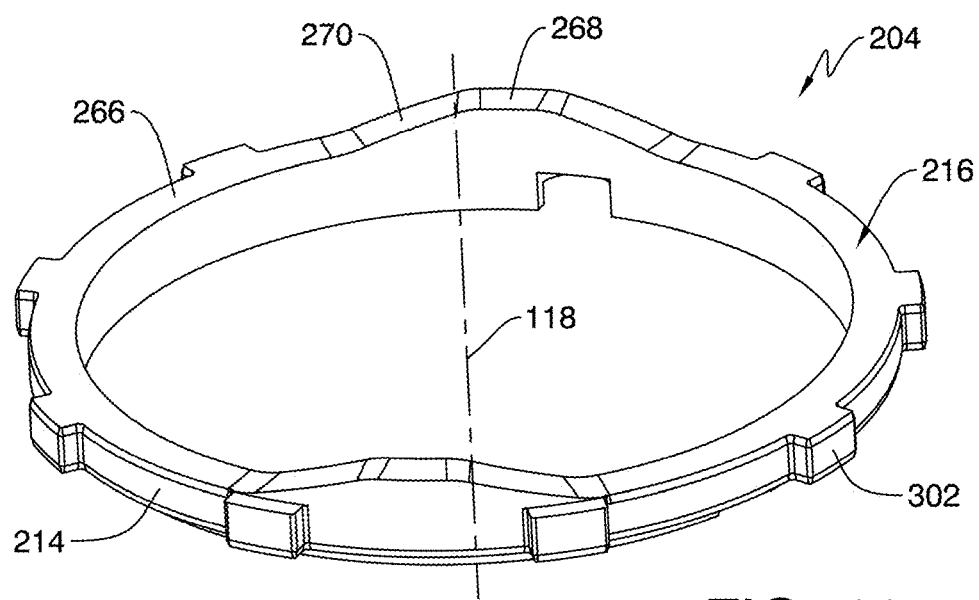
FIG. 19 is a perspective view of another component of the actuation mechanism of FIG. 14.

Referring to FIG. 19, the second cam member or cam follower 204 has a cylindrical body 214 with a cam profile, cam face or cam surface 216, on one end of the cylindrical body 214. The cam face or surface 216 of the second cam member or cam follower 204 may have a "wave" shape, pattern, or configuration. The cam surface 216 may include a base surface 266, a projecting member or surface 268, and ramps 270 extending between the base surface 266 and the projecting member or surface 268. The cam face or surface 216 of the second cam member or cam follower 204 engages and follows the first cam surface 210.

Figure 20:
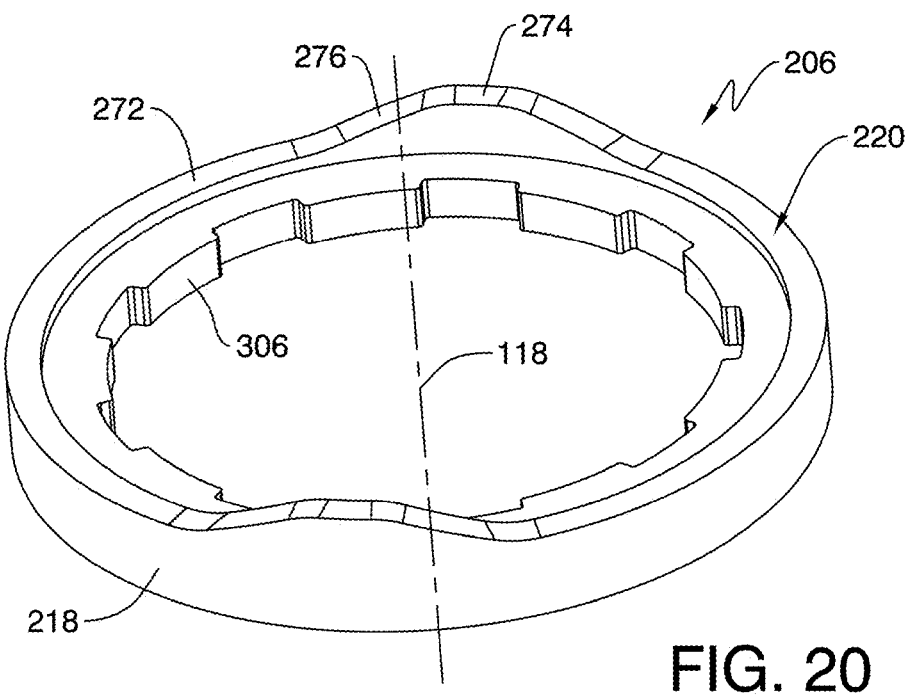
FIG. 20 is a perspective view of yet another component of the actuation mechanism of FIG. 14

Referring to FIG. 20, the third cam member or cam follower 206 has a cylindrical body 218 with a cam profile, cam face or cam surface 220, on one end of the cylindrical body 218. The cam face or surface 220 of the third cam member or cam follower 206 may have a "wave" shape, pattern, or configuration. The cam surface 220 may include a base surface 272, a projecting member or surface 274, and ramps 276 extending between the base surface 272 and the projecting member or surface 274. The cam face or surface 220 of the third cam member or cam follower 206 engages and follows the second cam surface 212.

The first cam surface 210 and second cam surface 212 of the first cam member 202 are concentric surfaces. The first cam surface 210 of the first cam member 202 is axially stacked with the cam surface 216 of the second cam or cam follower 204, and the second cam surface 212 of the first cam member 202 is axially stacked together with the cam surface 220 of the third cam 206. Accordingly, the second cam or cam follower 204 and the third cam or cam follower 206 also have concentric cylindrical surfaces, with one of the surfaces inside the other. The second cam member or cam follower 204 and the third cam member or follower 206 move independently along the respective first and second cam surfaces 210, 212 of the first cam member 202 as the first cam member 202 rotates. Rotation of the first cam member 202 and interaction of the respective cam surfaces 210, 216, 212, 220 axially moves the second and third cams or cam followers 204, 206 away from and toward the first cam member 202. Moving the respective second and third cams or cam followers 204, 206 places the linear actuator 200 in multiple positions.

The first cam member 202 has discreet positions, 0/0, 0/1, 1/0, and 1/1. The motor 170, through the gear assembly 250, rotates the first cam member 202 in either direction, shown by arrows 132, 140, to position the first cam member 202 in one of the positions, 0/0, 1/0, 0/1 and 1/1. Depending upon the selected position, interaction between the cam surfaces of the respective cam members 202, 204, 206, the second cam member or cam follower 204 moves between an extended, locking element deployed position and an initial or retracted, locking element non-deployed position, while the third cam member or follower 206 moves between an extended, locking element deployed position and an initial or retracted, locking element non-deployed position. Based on the combination of the deployed and non-deployed positions, the first and second locking elements 238, 240 mechanically couple the coupling members together.

In one example, the linear actuator 200 is a four-position actuator. The linear actuator 200 starts at the 0/0 mode and based on rotation and direction of the first cam member 202, other modes or positions are achieved. The linear actuator 200 may also start at one of the other modes, for example the 1/1 mode. In addition, rather than modes 1/0 or 0/1 being adjacent to mode 0/0, mode 1/1 could be adjacent to mode 0/0.

Figure 21:
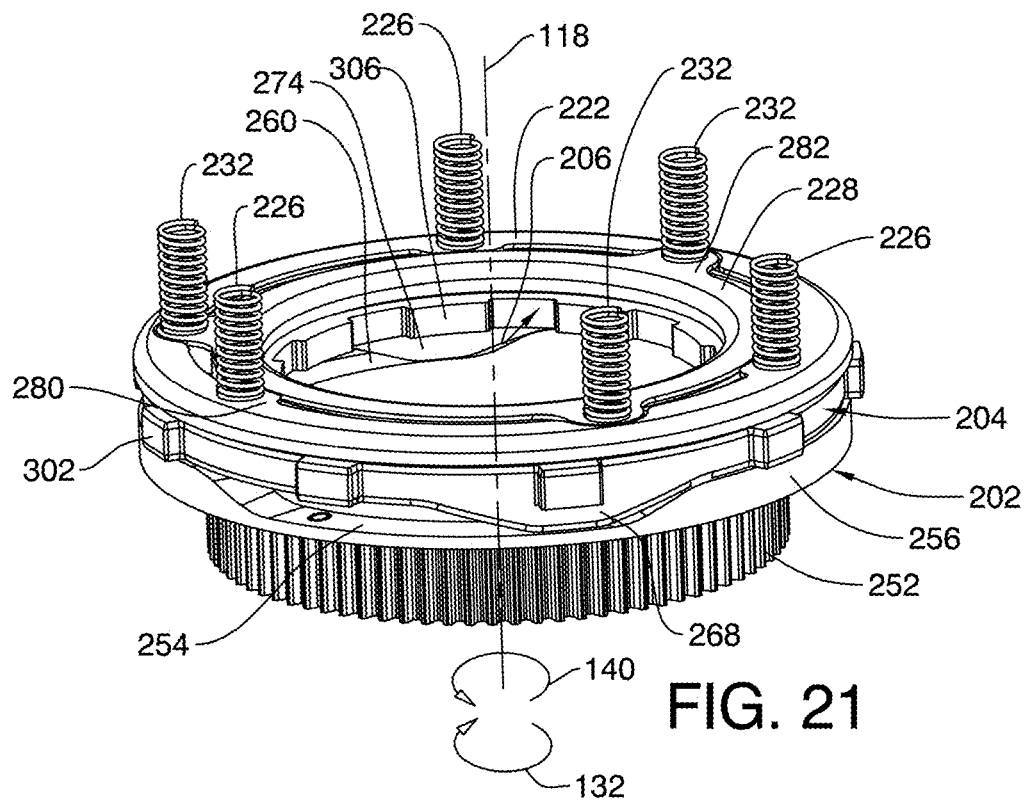
FIG. 21 is a partial, perspective view of part of the actuation mechanism of FIG. 14 in a first mode.
Figure 22:
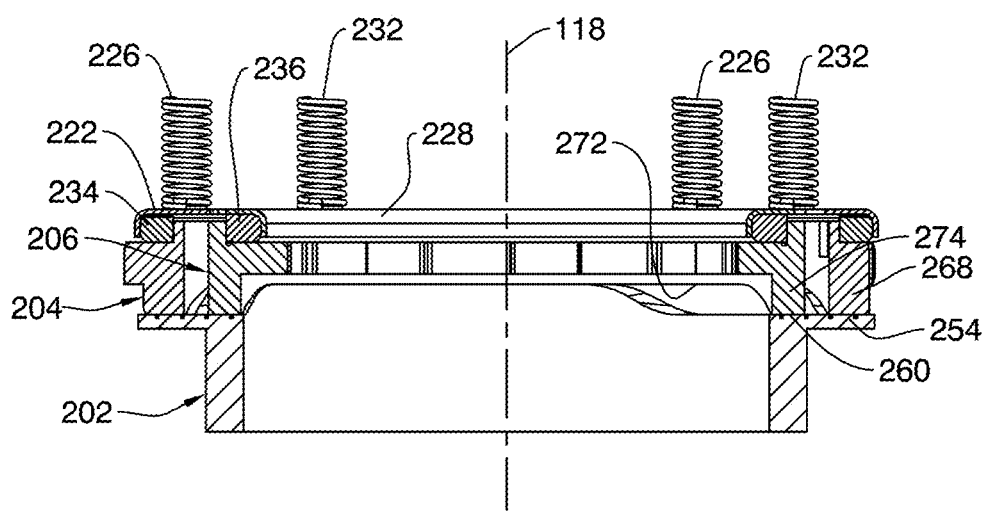
FIG. 22 is a cross-sectional view of the actuation mechanism of FIG. 21.

FIGS. 21, 22 show the linear actuator 200 in a 0/0 mode, with the second cam member or cam follower 204 and the third cam member or follower 206 in an initial or retracted position. The return springs 224, 230, which bias or urge the cam second and third cam members or cam followers 204, 206 and first cam member 202 together, are removed for clarity, with the actuation springs 226, 232 shown. In the first or initial position, the 0/0 mode, the first and second locking elements 238, 240 are in the non-deployed position, as both cam followers 204 and 206 of the linear actuator 200 are in the initial or retracted position. As illustrated in FIG. 22, in the initial or retracted position, the projecting members or surfaces 268, 274 of each of the second cam member or cam follower 204 and third cam member or follower 206 are located at the base 254, 260, of each of the first and second cam surfaces 210, 212. The actuation springs 226, 232 are in an initial, retracted position where they do not act on and deploy the locking elements 238, 240.

Figure 23:
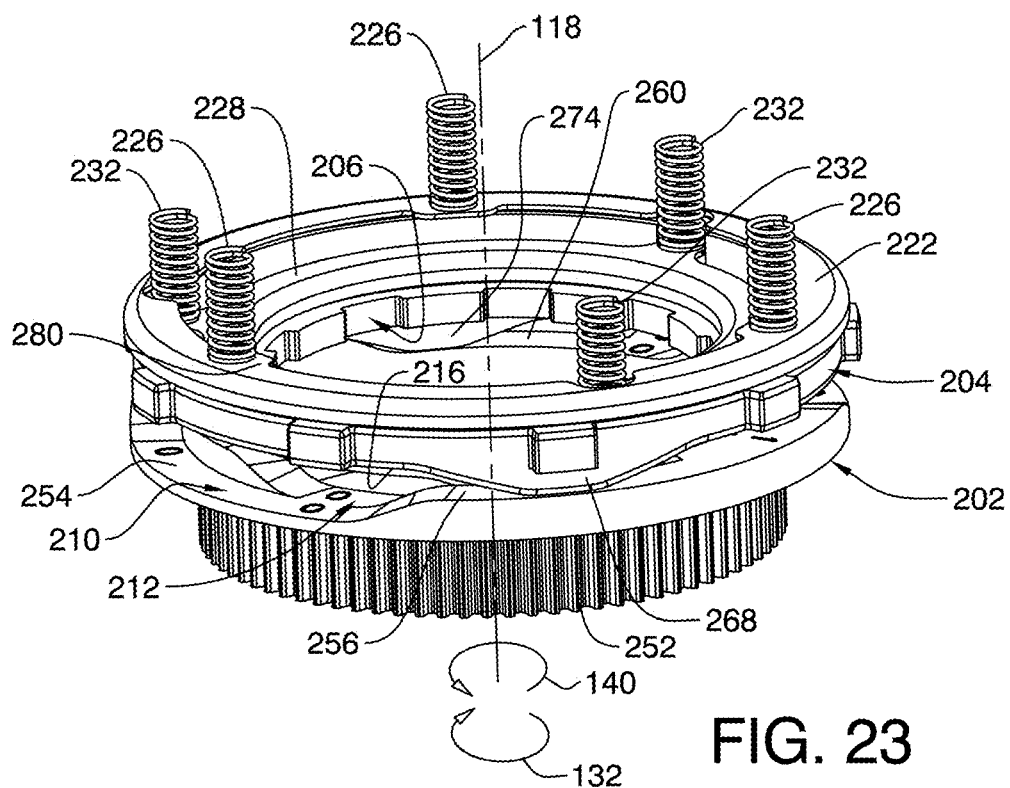
FIG. 23 is a partial, perspective view of part of the actuation mechanism of FIG. 14 in a second mode.
Figure 24:
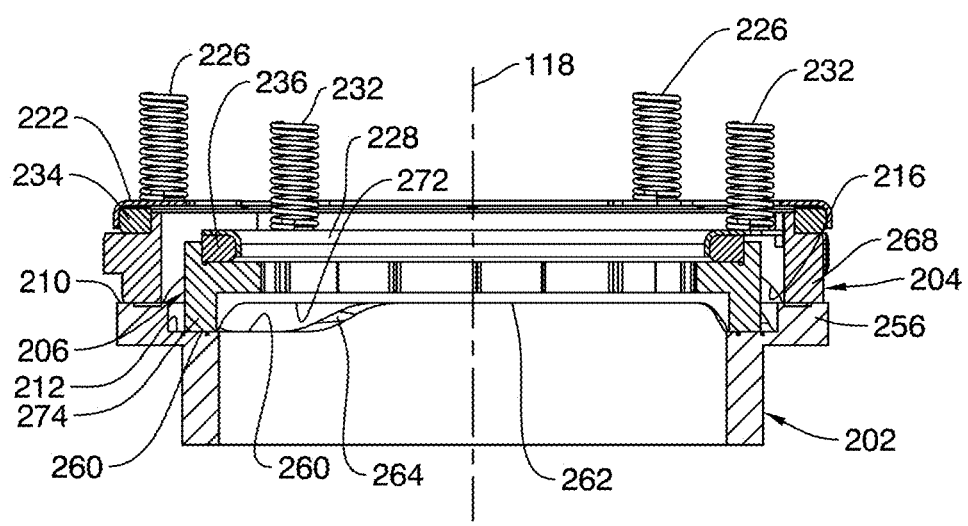
FIG. 24 is a cross-sectional view of the actuation mechanism of FIG. 23.

FIGS. 23, 24 illustrate the linear actuator 200 in a 1/0 mode. The second cam member or cam follower 204, the outer concentric ring, is positioned in an extended position. To achieve the 1/0 mode, the first cam member 202 is rotated clockwise, in the direction of the arrow 132, until the first projecting member or surface 256 of the first cam surface 210 of the first cam member 202 is adjacent or contacts the projecting member or surface 268 of the second of the cam surface 216 of the second cam or cam follower 204 thereby extending or moving the second cam or cam follower 204 axially with respect to the first cam member 202. Moving the second cam or cam follower 204 axially moves the first thrust plate or bearing member 234, the first spring plate 222, and actuation spring 226 axially, wherein the actuation spring 226 acts on the first locking element 238, placing it in a deployed position. Rotating the first cam member 202 in the clockwise direction, arrow 132, moves the linear actuator 200 from the 0/0 mode to the 1/0 mode. When rotating the first cam member 202 in the clockwise direction, shown by the arrow 132, the projecting member or surface 274 of the third cam member or follower 206, inner concentric ring, follows along the second cam surface 212 and remains on the base 260. The actuation spring 232 of the second spring plate 228 remains in the initial, retracted position where it does not act on and deploy the locking element 240.

Figure 25:
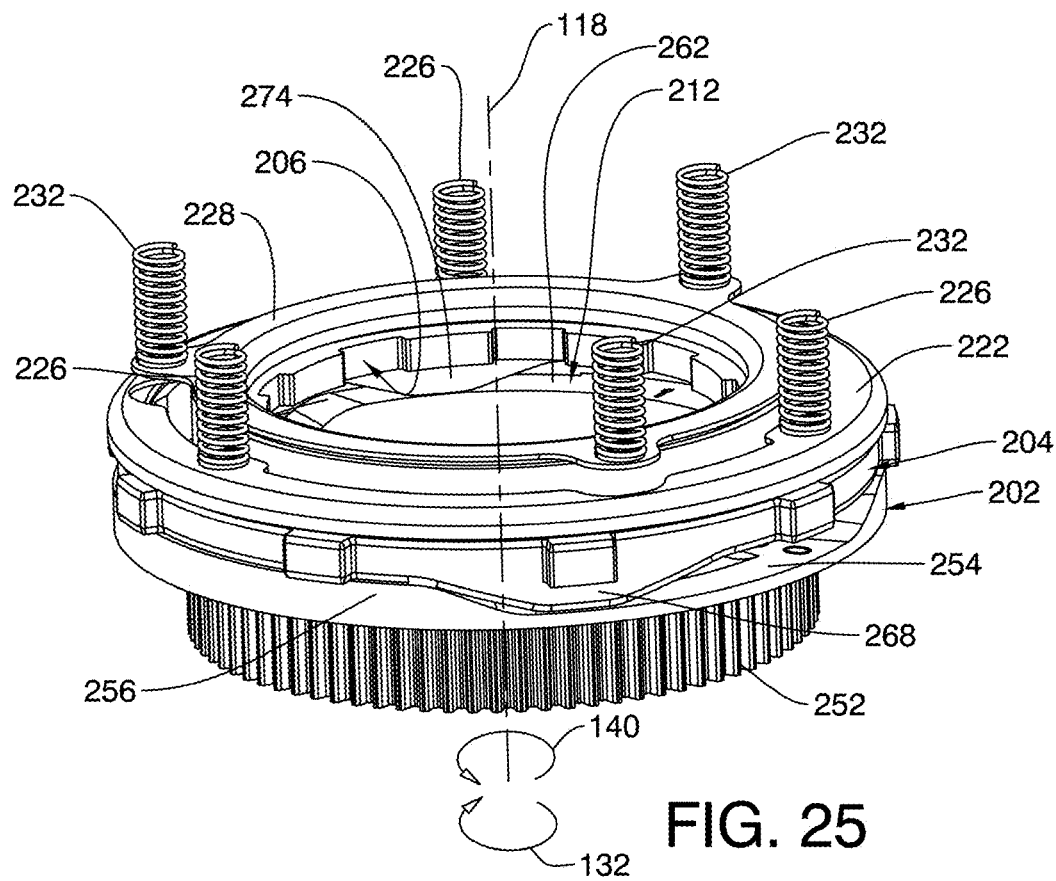
FIG. 25 is a partial, perspective view of part of the actuation mechanism of FIG. 14 in a third mode.
Figure 26:
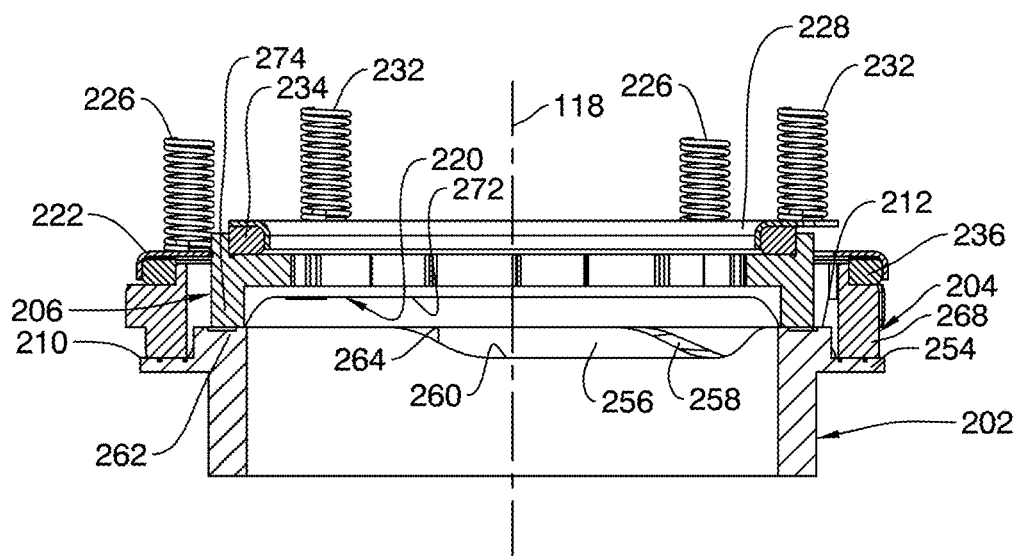
FIG. 26 is a cross-sectional view of the actuation mechanism of FIG. 25.

FIGS. 25, 26 illustrate the linear actuator 200 in a 0/1 mode. The third cam member or follower 206, the inner concentric ring, is positioned in an extended position. To achieve the 0/1 mode, the first cam member 202 rotates counterclockwise in the direction of the arrow 140, from the 0/0 mode until the projecting member or surface 262 of the second cam surface 212 of the first cam member 202 is adjacent or contacts the projecting member or surface 274 of the cam surface 220 of the third cam or cam follower 206 extending or moving the third cam or cam follower 206 axially with respect to the first cam member 202. In this position, the projecting member or surface 274 of the cam surface 220 of the third cam or cam follower 206 is adjacent or placed on the projecting member or surface 262 of the second cam surface 212 of the first cam member 202. Moving the third cam or cam follower 206 axially moves, through the second thrust plate or bearing member 236, the second spring plate 228 and actuation spring 232 in the axial direction wherein the actuation spring 232 acts on the second locking element 240 moving it to a deployed position. Rotating the first cam member 202 in the counterclockwise direction, arrow 140, moves the linear actuator 200 from the 0/0 mode to the 0/1 mode. When rotating the first cam member 202 in the counterclockwise direction, the projecting member or surface 268 of the second cam member or cam follower 204, outer concentric ring, follows the second cam surface 212 and remains on the base 254. The actuation spring 232 of the second spring plate 228 is in the initial or retracted position where it does not act on or deploy the locking element 238.

Figure 27:
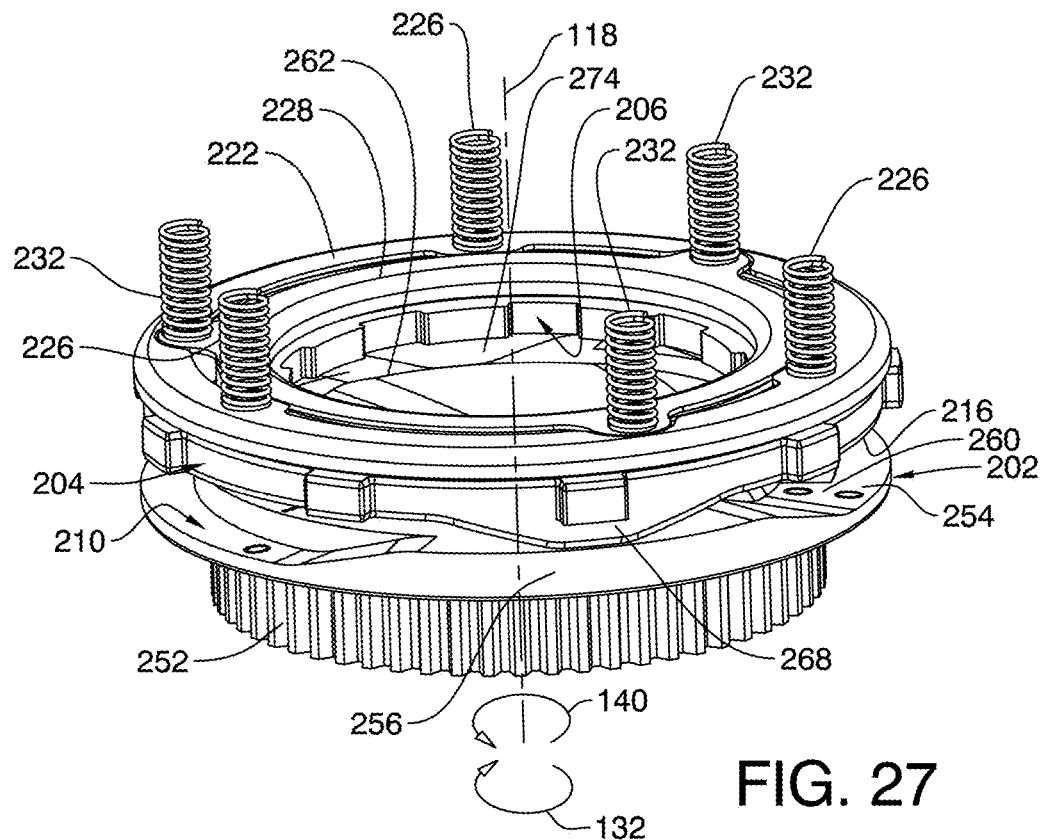
FIG. 27 is a partial, perspective view of part of the actuation mechanism of FIG. 14 in a fourth mode.
Figure 28:
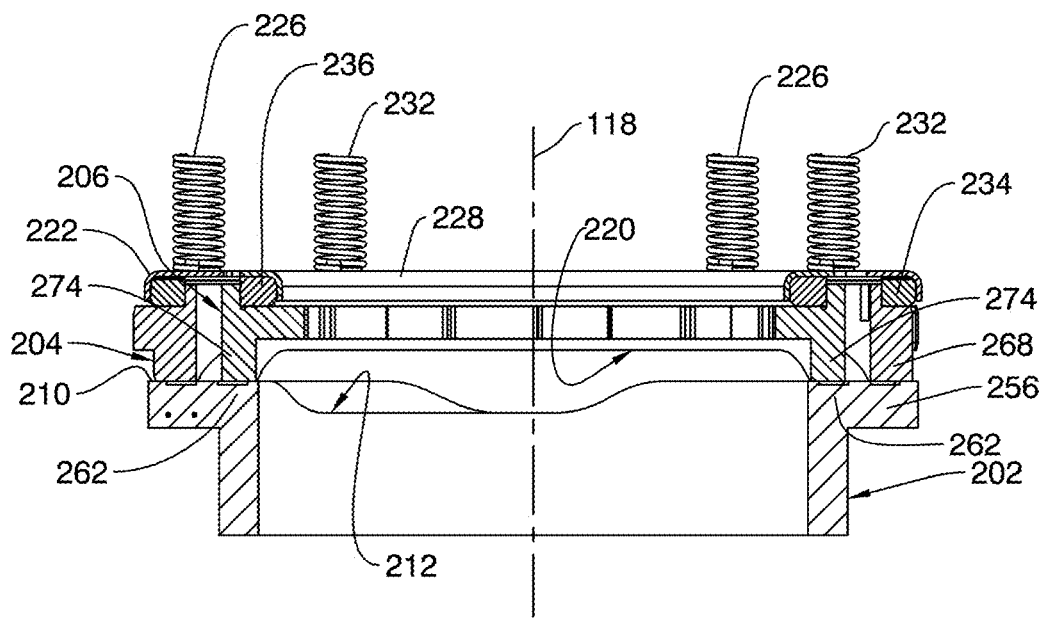
FIG. 28 is a cross-sectional view of the actuation mechanism of FIG. 27.

FIGS. 27, 28 illustrate the linear actuator 200 in a 1/1 mode. The second cam member or cam follower 204 and the third cam member or follower 206, the outer and inner concentric rings, are positioned in the extended position. To achieve the 1/1 mode, the first cam member 202 rotates either clockwise or counterclockwise from the 0/0 mode, through either the 1/0 or 0/1 modes until the first projecting member or surface 256 of the first cam surface 210 of the first cam member 202 is adjacent or contacts the projecting member or surface 268 of the second cam surface 216 of the second cam or cam follower 204 extending or moving the second cam or cam follower 204 axially with respect to the first cam member 202 and the projecting member or surface 262 of the second cam surface 212 of the first cam member 202 is adjacent or contacts the projecting member or surface 274 of the cam surface 220 of the third cam or cam follower 206 extending or moving the third cam or cam follower 206 axially with respect to the first cam member 202.

Moving the second cam or cam follower 204 axially correspondingly moves, through the first thrust plate or bearing member 234, the first spring plate 222 and actuation spring 226 in the axial direction wherein the actuation spring 226 acts on the first locking element 238, moving it to a deployed position. Moving the third cam or cam follower 206 axially correspondingly moves, through the second thrust plate or bearing member 236, the second spring plate 228 and actuation spring 232 in the axial direction wherein the actuation spring 232 acts on the second locking element 240 moving it to a deployed position. With both the first and second locking elements 238, 240 in a deployed position, the first coupling member or pocket plate 242 is coupled in both directions to the second coupling member or notch plate 244 by the locking elements 238, 240 extending from pockets 246 in the pocket plate and engaging notches 248 in the notch plate 244. Because the first coupling member or pocket plate 242 and second coupling member or notch plate 244 are connected to respective power components, for example, a driveshaft 184 and a driven shaft 182, coupling the pocket plate 242 to the notch plate 244 couples the driveshaft 184 and driven shaft 182 enabling power or torque transfer from the drive shaft to the driven shaft.

Figure 29:
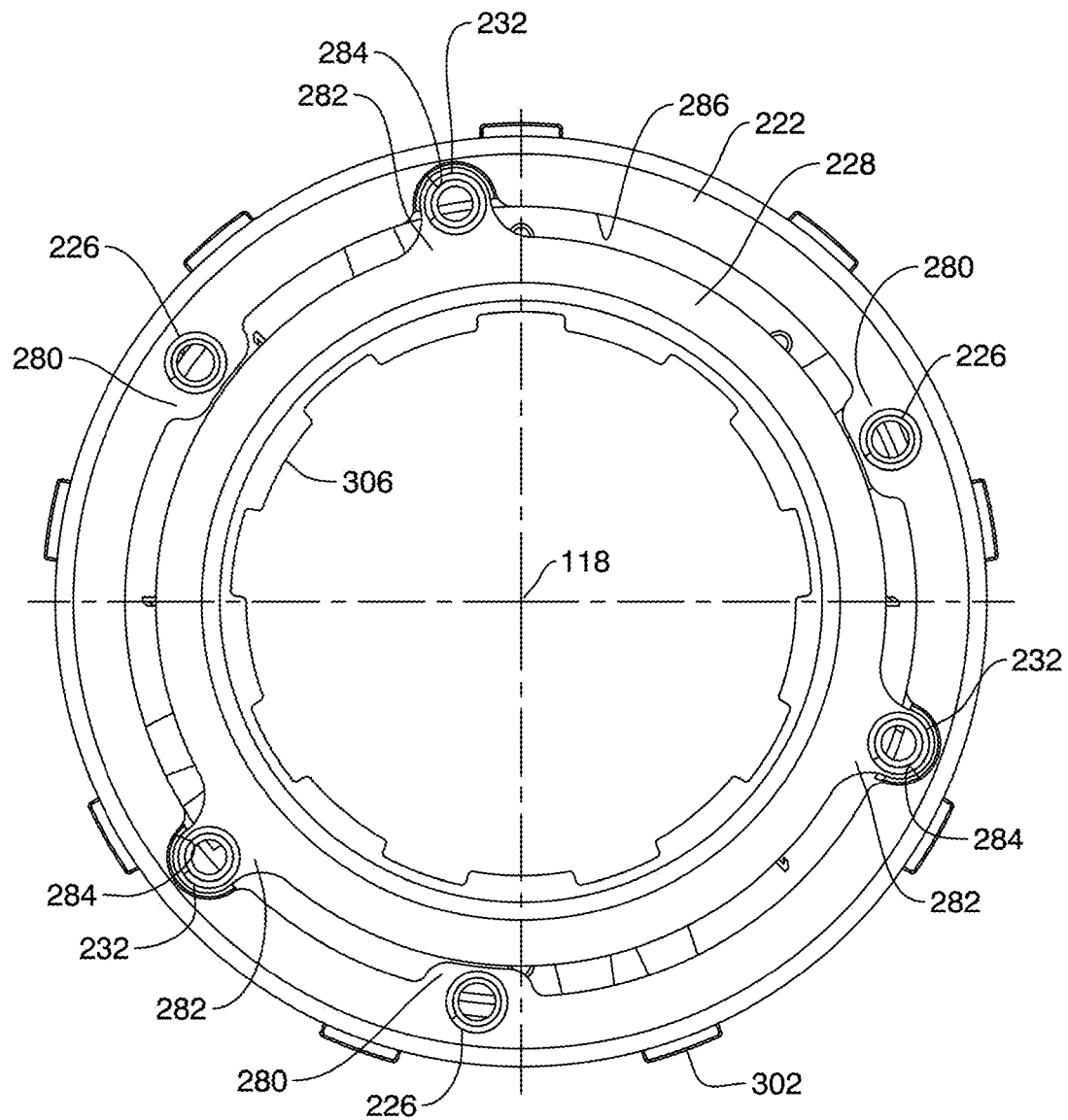
FIG. 29 is a top view of part of the actuation mechanism of FIG. 14 with portions removed for clarity.

FIG. 29 shows an outer actuation member for example, the first spring plate 222, having an annular configuration, and an inner actuation member for example, the second spring plate 228 having an annular configuration. The outer actuation member is concentric with the inner actuation member. While the respective first spring plate 222 and second spring plate 228 are inner and outer members spaced from one another, the actuation springs 226 and 232 are on the same radius, the same radial distance from the rotational axis 118. As illustrated, the first spring plate 222 includes inwardly extending tabs 280. The second spring plate 228 includes outwardly extending tabs 282 that extend into complementary notches 284 located in the inner circumferential surface 286 of the first spring plate 222. The respective inwardly extending tabs 280 and outwardly extending tabs 282 provide spring seats for the respective actuation springs 226 and 232.

The actuation spring 226 operates as link element connecting or linking the second cam member or cam follower 204 with one of the first and second locking elements 238, 240 and the actuation spring 232 operates as a link element connecting or linking the third cam member or cam follower 206 with the other of the first and second locking elements 238, 240. In addition, the first and second spring plates 222, 228 may also operate as link elements. These are but one example of link elements that may be used to connect or link the second and third cam members or cam followers 204, 206 with the first and second locking elements 238, 240. Other examples of a link or connecting element include resilient members, rods, or shaped members that transfer the axial motion of the second and third cam members or cam followers 204, 206 to the respective first and second locking elements 238, 240 to control the position of the first and second locking elements 238, 240. In some instances, the axial motion produced by the linear actuator 200 may be used to move one of the locking elements 238, 240 from a deployed to a non-deployed position.

Figure 30:
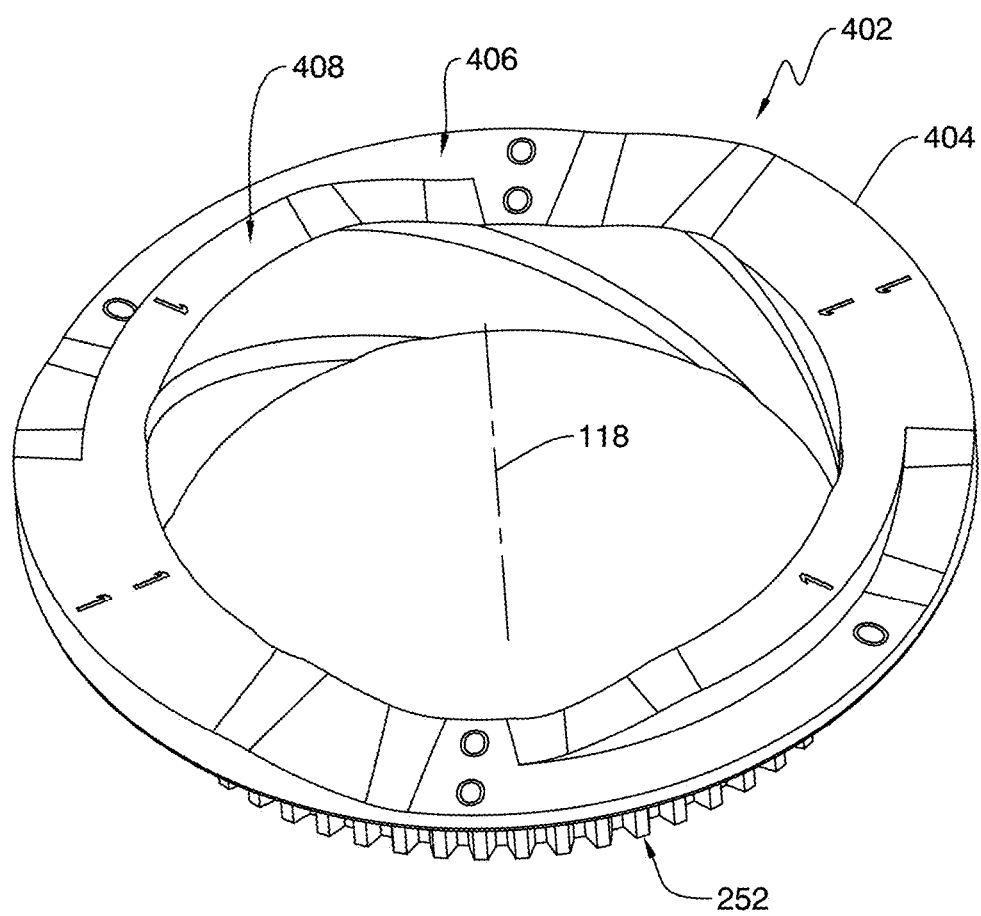
FIG. 30 is a perspective view of an alternative embodiment of a component of the actuation mechanism of FIG. 14.

FIG. 30 discloses another alternative embodiment of the linear actuator 200, wherein the linear actuator 200 is a three-position actuator. The three positions are 0/0, 1/1, and 1/0. Like the four-position actuator, the three-position actuator 402 uses a first cam member 404 having a first cam surface 406 and a second cam surface 408. The cam surfaces 406, 408 of the three-position actuator 402 include projections and bases. Like the previous embodiment, a second cam or cam follower and a third cam or cam follower cooperate with the first cam member 404 to move the first and second coupling members between a deployed and non-deployed position. The three-position actuator 402 may be placed initially in the 1/0 mode, wherein rotation in either direction places the actuator 402 in either the 0/0 mode or the 1/1 mode. The 1/0 mode could be used to actuate a locking element to transfer torque in either the clockwise or counterclockwise direction.

While exemplary embodiments are described above, it is not intended that these embodiments describe all possible forms of the present invention. The words used in the specification are words of description rather than limitation, and it is understood that various changes may be made without departing from the spirit and scope of the present invention. Additionally, the features of various implementing embodiments may be combined to form further embodiments of the present invention.

The description of the invention is merely exemplary in nature; thus, variations that do not depart from the gist of the invention are intended to be within the scope of the invention. Such variations are not to be regarded as a departure from the spirit and scope of the invention.

What is claimed is:

1. An actuation mechanism comprising:
   a cam member having an end face extending transversely to a rotational axis of the cam member, the end face having a first cam surface and a second cam surface, the first cam surface radially spaced from and adjacent to the second cam surface;
   a first cam follower, first cam follower following the first cam surface;
   a second cam follower, the second cam follower following the second cam surface;
   a first link between the first cam follower and a first coupling member; and
   a second link between the second cam follower and a second coupling member.

2. The actuation mechanism of claim 1 wherein the first cam surface and the second cam surface are concentric circular surfaces.

3. The actuation mechanism of claim 1 wherein:
   the first coupling member includes a locking element movable between a deployed position and a non-deployed position;
   the second coupling member includes a locking element movable between a deployed position and a non-deployed position;
   the first link includes a spring acting on the locking element of the first coupling member; and
   the second link includes a spring acting on the locking element of the second coupling member.

4. The actuation mechanism of claim 1 further comprising:
   an inner actuation member having an annular configuration;
   an outer actuation member having an annular configuration; and
   the inner actuation member is arranged concentrically inside the outer actuation member.

5. The actuation mechanism of claim 4 wherein:
   the inner actuation member includes a spring seat;
   the outer actuation member includes a spring seat; and
   the spring seat of the inner actuation member and the spring seat of the outer actuation member are radially equidistant from a rotational axis of the cam member.

6. The actuation mechanism of claim 4 wherein:
   the outer actuation member having an inwardly extending notch and a spring seat;
   the inner actuation member having an outwardly extending tab and a spring seat on the tab, the tab extends outward into the notch in the outer actuation member; and
   the spring seat of the outer actuation member and the spring seat of the inner actuation member at the same radial distance from a rotational axis of the cam member.

7. The actuation mechanism of claim 1 including:
   a gear assembly, including a plurality of gear teeth;
   the gear assembly connected to the cam member; and
   the gear assembly connected to a motor.

8. The actuation mechanism of claim 1 wherein the first cam follower and the second cam follower move independently.

9. The actuation mechanism of claim 1 wherein;
the first cam follower includes a cylindrically shaped body having a follower end and an outwardly extending projection;
the second cam follower includes a cylindrically shaped body having a follower end and an inwardly extending projection;
a housing having a first groove, the outwardly extending projection of the first cam follower engaging the first groove in the housing wherein the first cam follower moves axially in the housing; and
the housing having a second groove, the inwardly extending projection of the second cam follower engaging the second groove in the housing wherein the second cam follower moves axially in the housing.

10. An actuator comprising:
a cam member rotatable about a rotational axis, the cam member having a side surface extending between an outer peripheral surface and an inner peripheral surface;
the side surface of the cam member having a first cam surface and a second cam surface, the first cam surface radially inward of the second cam surface;
the first cam surface having a cam profile;
the second cam surface having a cam profile;
a first cam follower following the cam profile of the first cam surface wherein the first cam follower moves between an extended position and a retracted position based on the cam profile of the first cam surface; and
a second cam follower following the cam profile of the second cam surface, wherein the second cam follower moves between an extended position and a retracted position based on the cam profile of the second cam surface.

11. The actuator of claim 10 wherein the cam member moves the first and second cam followers to a first position wherein both the first cam follower and the second cam follower are in the extended position, a second position wherein both the first cam follower and the second cam follower are in the retracted position, and a third position wherein one of the first cam follower and the second cam follower is in the extended position, and the other cam follower is in the retracted position.

12. The actuator of claim 10 wherein the cam member moves the first and second cam followers to a first position wherein both the first cam follower and the second cam follower are in the extended position, a second position wherein both the first cam follower and the second cam follower are in the retracted position, a third position wherein the first cam follower is in the extended position and the second cam follower is in the retracted position, and a fourth position wherein the first cam follower is in the retracted position and the second cam follower is in the extended position.

13. The actuator of claim 10 wherein the first and second cam followers move independently.

14. The actuator of claim 10 wherein the first cam follower is connected to and moves a first locking element, and the second cam follower is connected to and moves a second locking element.

15. A system comprising:
a first component;
a second component;
first and second coupling members supported for rotation relative to one another in first and second directions about a rotational axis, the first coupling member fixed to the first component and the second coupling member fixed to the second component;
a first locking element movable between a deployed position in which the first locking element mechanically couples the first and second coupling members together and a non-deployed position in which the first and second coupling members are not mechanically coupled together;
a second locking element movable between a deployed position in which the second locking element mechanically couples the first and second coupling members together and a non-deployed position in which the first and second coupling members are not mechanically coupled together;
an actuator including a cam member rotatably movable and axially fixed relative to the rotational axis, the cam member having a first cam surface and a second cam surface, the first cam surface radially spaced from the second cam surface;
a first cam follower rotatably fixed and axially movable relative to the rotational axis, the first cam follower contacting and following the first cam surface;
a second cam follower rotatably fixed and axially movable relative to the rotational axis, the second cam follower contacting and following the second cam surface; and
the cam member moves the first and second cam followers to a first position wherein both the first and second cam followers are extended, a second position wherein both the first and second cam followers are retracted, and a third position wherein one of the first cam follower and the second cam follower is extended and the other cam follower is retracted.

16. The system of claim 15 wherein the first cam surface and second cam surface are concentric surfaces on a surface of the cam member extending transverse the rotational axis.

17. The system of claim 15 wherein:
the first coupling member having a plurality of pockets, the first locking element positioned in one of the pockets, and the second locking element positioned in another pocket;
a link extending between the first locking element and the first cam follower, wherein the first cam follower moves the first locking element to one of the deployed and non-deployed positions; and
a link extending between the second locking element and the second cam follower wherein the second cam follower moves the second locking element to one of the deployed and non-deployed positions.

18. The system of claim 17 wherein:
the link extending between the first locking element and the first cam follower includes a spring; and
the link extending between the second locking element and the second cam follower includes a spring.

19. The system of claim 15 wherein the first and second cam followers move independently.

* * * * *